(12) United States Patent
Chopra et al.

(10) Patent No.: US 10,683,404 B2
(45) Date of Patent: Jun. 16, 2020

(54) POROUS POLYMER NANOCOMPOSITES WITH ORDERED AND TUNABLE CRYSTALLINE AND AMORPHOUS PHASE DOMAINS

(71) Applicant: SABIC Global Technologies B.V., Bergen op Zoom (NL)

(72) Inventors: Nitin Chopra, Sugar Land, TX (US); Saad Alhussain, Sugar Land, TX (US); Ihab N. Odeh, Sugar Land, TX (US)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 86 days.

(21) Appl. No.: 15/776,828

(22) PCT Filed: Nov. 11, 2016

(86) PCT No.: PCT/IB2016/056822
§ 371 (c)(1),
(2) Date: May 17, 2018

(87) PCT Pub. No.: WO2017/085606
PCT Pub. Date: May 26, 2017

(65) Prior Publication Data
US 2018/0371190 A1 Dec. 27, 2018

Related U.S. Application Data

(60) Provisional application No. 62/256,367, filed on Nov. 17, 2015, provisional application No. 62/420,160, filed on Nov. 10, 2016.

(51) Int. Cl.
*C08J 5/18* (2006.01)
*C08L 23/06* (2006.01)
(Continued)

(52) U.S. Cl.
CPC .................. *C08J 5/18* (2013.01); *C08J 3/201* (2013.01); *C08K 7/00* (2013.01); *C08K 7/06* (2013.01);
(Continued)

(58) Field of Classification Search
CPC ....... C08J 5/18; C08J 3/201; C08K 2201/001; C08K 3/013; C08K 7/18; C08K 2201/011; B82Y 30/00
See application file for complete search history.

(56) References Cited

U.S. PATENT DOCUMENTS 7,785,415 B2 8/2010 Lin et al.
8,293,624 B2 10/2012 Romano et al.
(Continued)

FOREIGN PATENT DOCUMENTS

WO WO 2017/085606 5/1917
WO WO 2014/146691 9/2014

OTHER PUBLICATIONS

Allegra, et al., "Definitions of Terms Relating to Crystalline Polymers," Pure and Appl. Chem, 61(4): 769-785, 1989.
(Continued)

*Primary Examiner* — Hai Vo
(74) *Attorney, Agent, or Firm* — Norton Rose Fulbright US LLP

(57) ABSTRACT

Polymeric materials, method of making the polymeric material, and uses thereof are disclosed. The polymeric material can include ordered arrangements of crystalline domains and ordered arrangements of amorphous domains.

19 Claims, 11 Drawing Sheets

(51) Int. Cl.
| | |
|---|---|
| C08L 23/12 | (2006.01) |
| C08K 7/00 | (2006.01) |
| C08K 7/06 | (2006.01) |
| C08K 7/18 | (2006.01) |
| C08J 3/20 | (2006.01) |
| C08L 79/08 | (2006.01) |
| C08K 3/08 | (2006.01) |
| B82Y 30/00 | (2011.01) |
| C08K 3/013 | (2018.01) |

(52) U.S. Cl.
CPC .......... C08K 7/18 (2013.01); C08L 23/06 (2013.01); C08L 23/12 (2013.01); C08L 79/08 (2013.01); B82Y 30/00 (2013.01); C08J 2323/06 (2013.01); C08J 2323/12 (2013.01); C08J 2379/08 (2013.01); C08J 2423/06 (2013.01); C08J 2423/12 (2013.01); C08J 2479/08 (2013.01); C08K 3/013 (2018.01); C08K 2003/0806 (2013.01); C08K 2201/001 (2013.01); C08K 2201/004 (2013.01); C08K 2201/011 (2013.01); C08L 2203/16 (2013.01); C08L 2205/025 (2013.01); C08L 2205/035 (2013.01); C08L 2207/02 (2013.01); C08L 2207/062 (2013.01); C08L 2207/066 (2013.01); C08L 2314/00 (2013.01)

(56) References Cited

U.S. PATENT DOCUMENTS

| | | |
|---|---|---|
| 2011/0142091 A1 | 6/2011 | Wardle et al. |
| 2012/0132644 A1 | 5/2012 | Gu et al. |
| 2013/0017473 A1 | 1/2013 | Kim et al. |
| 2013/0087278 A1 | 4/2013 | Chang et al. |
| 2014/0042150 A1 | 2/2014 | Lee |
| 2015/0044383 A1 | 2/2015 | Kim et al. |

OTHER PUBLICATIONS

Arman, et al., "Viscoelastic Properties and Shock Response of Coarse-Grained Models of Multiblock versus Diblock Copolymers: Insights into Dissipative Properties of Polyurea," *Macromolecules*, 45(7): 3248-3255, 2012.
Beblo, et al., "Joule Heating of Shape Memory Polymer with Magnetically Aligned Nickel Particles," 25nd International Conference on Adaptive Structures and Technologies, Oct. 6-8, 2014, The Hague, The Netherlands.
Chien, et al., "Electrical Conductivity and Joule Heating of Polyacrylonitrile/Carbon Nanotube Composite Fibers," *Polymer*, 55(26): 6896-6905, 2014.
Chopra, et al., "Solution Growth of ZnO Microwires and Grass Architectures," *Materials Science and Engineering*: B, 178(11): 785-793, 2013.
DiStefano, et al., "Highly Ordered Alignment of a Vinyl Polymer by Host-Guest Cross-Polymerization," *Nature Chemistry*, 5(4), 335-341, 2013.
Ebeling, et al., "Ideal Molecular Weight Distributions of Multiblock Copolymers Prepared via RAFT Polymerization," *Macromolecules*, 43(24): 10283-10290, 2010.
Echeverri, et al., "Highly Conductive, Completely Amorphous Polymer Electrolyte Membranes Fabricated Through Photo-Polymerization of Poly(Ethylene Glycol Diacrylate) in Mixtures of Solid Plasticizer and Lithium Salt," *Solid State Ionics*, 254: 92-100, 2014.
Edrington, et al., "Polymer-Based Photonic Crystals," *Advanced Materials*, 13(6): 421-425, 2001.
Fujimori & Hayasaka, et al., "Changes in Arrangement of Lamella and Fine Crystallite in Fluorinated "Crystalline" Transparent Fibers with Drawing," *Macromolecules*, 41(20), 7606-7615, 2008.

Hustad, et al., "Photonic Polyethylene from Self-Assembled Mesophases of Polydisperse Olefin Block Copolymers," *Macromolecules*, 42(11): 3788-3794, 2009.
International Search Report and Written Opinion Issued in Corresponding PCT Application No. PCT/IB2016/056822, dated Feb. 10, 2017.
Jin, et al., "Highly Integrated Synthesis of Heterogeneous Nanostructures on Nanowire Heater Array," *Nanoscale*, 6: 14428-14432, 2014.
Jin, et al., "Localized Temperature and Chemical Reaction Control in Nanoscale Space by Nanowire Array," *Nano Letters*, 11(11): 4818-4825, 2011.
Liu, et al., "Templateless Assembly of Molecularly Aligned Conductive Polymer Nanowires: A New Approach for Oriented Nanostructures," *Chemistry A European Journal*, Feb 39(3): 604-611, 2003.
Lu, et al., "Carbon-Based Reinforcement in Shape-Memory Polymer Composite for Electrical Actuation," *Pigment and Resin Technology*, 43: 26-34, 2014.
Lu, et al., "Enhanced Charge Transportation in Semiconducting Polymer/Insulating Polymer Composites: The Role An Interpenetrating Bulk Interface," *Advanced Functional Materials*, 20(11): 1714-1720, 2010.
Ma, et al.,, "Controllable Growth of High Quality Metaloxide/ Conducting Polymerhierarchical Nanoarrays with Outstanding Electrochromic Properties and Solar-Heat Shielding Ability," *Journal of Materials Chemistry A*, 2: 13541-13549, 2014.
Mas, et al., "Thermoset Curing Through Joule Heating of Nanocarbons for Composite Manufacture Repair and Soldering," *Carbon*, 63: 523-529, 2013.
Park, et al., "Selective Surface Functionalization of Silicon Nanowires via Nanoscale Joule Heating," *Nano Letters*, 7(10): 3106-3111, 2007. DOI: 10.1021/nl071637k PMID: 17894518.
PCT Application No. PCT/US2016/39841 claiming benefit of U.S. Appl. No. 62/188,087, "Process and Material for Growth of Absorbed Compound Via Nanoscale-Controlled Resistive Heating for Use in Chemical Applications".
Peng, et al., "Synthesis of Large-Area Silicon Nanowire Arrays via Self-Assembling Nanoelectrochemistry," *Advanced Materials*, 14(16): 1164-1167, 2002.
Pillai, et al., "Tailored Nanostructuring of End-Group-Functionalized High-Density Polyethylene Synthesized by an Efficient Catalytic Version of Ziegler's Aufbaureaktion," *Chemistry A European Journal*, 18(44): 13974-13978, 2012.
Schneider, et al., "Investigation of Changes in Crystalline and Amorphous Structure During Deformation of Nano-Reinforced Semi-Crystalline Polymers by Space-Resolved Synchrotron SAXS and WAXS," *Procedia Engineering*, 1(1): 159-162, 2009.
Song, et al., "Nanoscale Joule Heating and Electromigration Enhanced Ripening of Silver Nanowire Contacts," *ACS Nano*, 8(3): 2804-2811, 2014. doi: 10.1021/nn4065567.
Sung, et al., "The Adhesive Bonding With Buckypaper-Carbon Nanotube/Epoxy Composite Adhesives Cured by Joule Heating," *Carbon*, 91: 215-223, 2015.
Trau, et al., "Microscopic Patterning of Orientated Mesoscopic Silica Through Guided Growth," *Nature*, 390(6661), 674-676, 1997.
Wang, et al., "Molecular Disassembly of Starch Granules During Gelatinization and Its Effect on Starch Digestibility: A Review," *Food & Function*, 4(11): 1564-1580, 2013.
Xu, et al., "Effect of Glass Fiber and Crystallinity on Light Transmission During Laser Transmission Welding of Thermoplastics," *Optics and Laser Technology*, 69, 133-139, 2015.
Xu, et al., "One-Dimensional ZnO Nanostructures: Solution Growth and Functional Properties," *Nano Research*, 4(11), 1013-1098, 2011.
Yeo, et al., "Single Nanowire Resistive Nano-heater for Highly Localized Thermo Chemical Reactions Localized Hierarchical Heterojunction Nanowiree Growth," *Small*, 10(24), 5015-5022, 2014.
Yoshikawa, et al., "Barrier Modification at Contacts between Carbon Nanotube and Pt Electrode Using Well-Controlled Joule Heating," *Japanese Journal of Applied Physics*, 46 Part 2: L359, 2007.
Yun, et al., "A Self-Heated Silicon Nanowire Array: Selective Surface Modification with Catalytic Nanoparticles by Nanoscale

(56) References Cited

OTHER PUBLICATIONS

Joule Heating and Its Gas Sensing Applications," Nanoscale, 5(15): 6851-6856, 2013. DOI: 10.1039/c3nr01640d.

Yun, et al., "Compliant Silver Nanowire-Polymer Composite Electrodes for Bistable Large Strain Actuation," *Advanced Materials*, 24(10): 1321-1327, 2012.

Zhang, et al., "Regulation of Crystalline Morphologies and Mechanical Properties of Olefin Multiblock Copolymers by Blending Polymer with Similar Architecture of Constituent Blocks," *Polymer*, 73, 139-148, 2015.

SAMPLE # 2
BEFORE JOULE HEATING

SAMPLE # 1
AFTER JOULE HEATING

BLANK PP
SAMPLE # 7

NO JOULE HEATING
SAMPLE # 5

AFTER JOULE HEATING
SAMPLE # 4

SAMPLE # 9
BEFORE JOULE HEATING

SAMPLE # 8
AFTER JOULE HEATING ions of temperature gradient, or regions with high temperature, between the nanostructure template. Such temperature gradients or regions can be generated by controlling the shape of the polymeric network. For example, nanowires that form a close or a confined region (e.g., triangular-like shape) can produce intense temperature gradients or regions in a polymeric domain, resulting in crystalline domains. These confined regions are able to generate relatively higher

POROUS POLYMER NANOCOMPOSITES WITH ORDERED AND TUNABLE CRYSTALLINE AND AMORPHOUS PHASE DOMAINS

CROSS REFERENCE TO RELATED APPLICATIONS

This application is a national phase application under 35 U.S.C. § 371 of International Application No. PCT/IB2016/056822 filed Nov. 11, 2016, which claims priority to U.S. Provisional Patent Application No. 62/256,367 filed Nov. 17, 2015, and U.S. Provisional Patent Application No. 62/420,160 filed Nov. 10, 2016. The entire contents of each of the above-referenced disclosures are specifically incorporated herein by reference without disclaimer.

BACKGROUND OF THE INVENTION

A. Field of the Invention

The invention generally concerns polymeric material and methods of making the same. In particular, the invention relates to a polymeric matrix having an ordered arrangement of nanoscale polymeric crystalline phase domains and an ordered arrangement of nanoscale polymeric amorphous phase domains that can be obtained through resistive-joule heating of an embedded nanostructured template.

B. Description of Related Art

Because of their diverse physical and mechanical properties, polymers have become essential materials in a variety of applications (for example, defense systems, medical, chemical, optical, industrial and environmental applications). Polymers tend to crystallize upon precipitation or as they are cooled from a melt. Depending on the crystallization methods, polymers can have crystalline domains and amorphous domains within the polymeric matrix. Some of the major problems associated with advanced applications of polymers are their multi-functionality, ordering, and chain alignment/directionality, which can lead to uncontrolled polymer crystalline and/or amorphous phase domain morphology. Many problems associated with polymer crystallization include: (a) irregular domains with poor domain size control that can result in variations in properties such as poor electrical conductivity, and non-uniform dangling bond chemistry, and opacity of the polymers; (b) length variations in polymer chains due to chemical potential imbalance; c) broad range of polydispersity index (PDI) and degree of polymerization (DP), which can largely affect the domain sizes in polymers (crystallite size); (d) polymer swelling caused due to (a), (b), and (c) and defect formation; (e) limited control over interfaces between crystalline and amorphous regions of polymers; and (f) random ordering, which makes 2D ordering easier than 3-D ordering. These problems can lead to poor reversibility in polymer structure when cycled through temperatures or other harsh conditions.

Numerous attempts to control the growth and produce highly crystalline domains have been disclosed. By way of example, Liu et al., "Templateless assembly of molecularly aligned conductive polymer nanowires: a new approach for oriented nanostructures", Chemistry, 2013, 3, 604-11, describes growing molecularly aligned conducting polymers without using a porous membrane to support the polymer. Distefano et. al., "Highly ordered alignment of a vinyl polymer by host-guest cross-polymerization," Nature Chemistry, 2-13. 5. 335-341, describes reliance on ordered cross-links to produce polymeric materials that exhibit crystalline arrangement. Attempts to provide even heating through the use of nanocarbon polymeric heaters are disclosed in Mas et al., "Thermoset curing through Joule heating of nanocarbons for composite manufacture, repair, and soldering", Carbon, 2013, 63, 523-529, U.S. Patent Publication Nos. 20110142091 to Wardel et al., 20130087278 to Chang et al., and International Application Publication No. WO201414669 to Garcia et al.

Ordered polymer films, patterns, photonic crystals, and porous structures have been synthesized using complex bulk/solution heating processes, which can involve high temperatures (See, for example, Yanagisita et al., Journal of Membrane Science, 1997, 136, 121-126, and Principles of Polymer systems, Ferdinand Rodriguez, Taylor & Francis, 1996, Philadelphia, Pa.). However, these processes suffer in their inability to control domain size and the local polymer chain environment.

Despite all the currently available research on crystallization of polymers, many processes suffer from formation of temperature gradients, both at local (nanometer) and bulk (nano/micro or macro) scale, during the polymerization process, which can provide polymers having undesirable and random crystal properties, and thus resulting in less desirable polymer properties (e.g., mechanical strength, transparency, flexibility, etc.).

SUMMARY OF THE INVENTION

A solution to the current problems associated with crystallization of polymers has been discovered. The solution lies in the ability to design and make porous membranes that include ordered polymers with tunable crystalline and amorphous domains or phase gradients through resistive Joule heating of an embedded nanostructured template. Without wishing to be bound by theory, it is believed that crystalline phase domains are developed closer to the nanostructured template, whereas amorphous domains are developed in areas further away from the template. In particular, the use of resistive Joule heating via nanowire or nanotube templates is an elegant way to control temperature gradients in the surrounding within a range of a few tens or hundreds of nanometers with the latter being dependent on the spatial density and architecture of the templates. Such resistive Joule heating provides the ability to tune the order, chain orientation, domain size, composition, and porosity of the resulting polymeric material. The polymer crystallinity, porosity, and dangling bonds can be tuned to provide specific properties (e.g., surface area, transparency, and transport characteristics of the composites or membranes) for chosen applications. The approach of using nanometer scale templates as joule heaters can enable fine control of thermal gradients in the surrounding precursor solutions, which will impart ordering of polymer structure or result in phase gradient in the polymerizing monomers as a function of inter-template spacing. This method can also convert semi-crystalline polymer into crystalline or result in tunable crystallinity. The degree of crystallization can be increased by increasing the temperature gradient, or regions with high temperature, between the nanostructure template. Such temperature gradients or regions can be generated by controlling the shape of the polymeric network. For example, nanowires that form a close or a confined region (e.g., triangular-like shape) can produce intense temperature gradients or regions in a polymeric domain, resulting in crystalline domains. These confined regions are able to generate relatively higher temperatures as compared to regions that have less density of nanowires or enclosures formed by the same.

Notably, this allows for the production of multifunctional and ordered nano-architecture polymeric material that includes polymers, and can also include inorganic nanostructures. The polymeric material can be inherently porous; however, the porosity can be tuned through selection of polymer material and selective removal of nanostructures in the polymeric material. The porosity of the polymer membrane can be i) straight pores across the thickness of the film due to the template architecture and/or ii) tortuous pores by virtue of polymer matrix ordering (e.g., a tortuosity ranging from 0 to approach infinity, or 10,000,000 or more, or 100 or more, preferably 0.5 to 1.5 (assuming a square cross section or cubical volume). These porous polymers can include embedded metal or metal oxide nanostructures, which provide extra functionality such as nano-heaters, templates, catalysts, sensors, absorbers, emitters, additives, and/or fillers. Randomly dispersed templates on the substrates can also allow for polymer ordering and tunability in the sheet direction of the composite film. The polymeric material of the present invention can be tuned to provide polymers for a variety of applications such as selective membranes for catalysis, photonics and optics, electro or thermo chromic systems, actuators and modulators, switch and pressure-sensitive adhesive, electrodes, sensors, flexible devices, and opto-electronics systems. Notably, due to the ability to fine tune opacity/transparency properties of the polymer material, the polymers can be useful in optical films, coatings, structures, and porous media, where light-matter interaction could be modulated. By way of example, the polymer material of the present invention can be used a coating in which its optical properties can change by application of pressure or force such as through compression or tension. By compressing the pores of the material, its light absorption and reflection properties can be changed, thereby making the materials of the present invention useable as stress detection materials (e.g., stress detection on bulk metal surface as any stresses on the surface of metal or alloys will lead to compression or tension in our polymer coating, which could change color in light) or alternatively in security applications (e.g., pressing a particular portion of a given substrate (e.g., money such as a dollar bill) can confirm whether the substrate is authorized), and the like. Similarly, the porosity of the materials can also allow for their use in creating humidity or chemical barrier coatings. In another example, the tuned amorphous and crystalline domains within the nanocomposite can impart angular-dependent light-matter interaction or transparency, which is useful for smart window or light detector/modulator design. Finally, a 3-D architecture to the composite can be imparted to the polymeric material by the selective removal of the inorganic templates.

In a particular aspect of the present invention, a polymeric material that includes a polymeric matrix having an ordered arrangement of nanoscale polymeric crystalline phase domains and an ordered arrangement of nanoscale polymeric amorphous phase domains is described. The polymeric material can be porous and include an ordered arrangement of voids that extend through the entire thickness of the polymeric matrix. The ordered arrangement of voids can be channels having a tortuosity ranging from 0 to approach infinity, or 10,000,000 or more, or 100 or more, preferably 0.5 to 1.5, and/or represent areas where an electrically conductive nanostructured template included in the polymeric matrix has been partially or fully etched away from the matrix. The nanostructured template can include an arrangement of nanostructures (e.g., nanowires, nanotubes nanorods, nanospike, nanofibers, nanodisks, nanospheres, nanoellipsoid, nanoballs, nanograss, nanoflower or any combination thereof) that are vertically aligned, slanted, randomly dispersed, or form a polygonal shape, a square-like shape, a triangle-like shape, a flower-like shape, a grass-like shape, a gyroid shape, a flagella-like shape, a hair-like shape, a seaweed-like shape, or a sea urchin-like shaped. In some aspects of the invention, the nanostructures are randomly oriented. In some aspects, the ordered arrangements of nanoscale polymeric crystalline phase domains and nanoscale polymeric amorphous phase domains are the reaction product of resistive Joule heating of an electrically conductive nanostructured template and a precursor composition comprising (i) polymerizable monomers, pre-polymers, or polymers, a combination thereof, or (ii) a polymer melt. Without wishing to be bound by theory, it is believed that the use of Joule heating allows tuning the polymer characteristics at nanometer scale by influencing temperature gradients during the polymerization process. Such controlled heating and effective heat transport can allow for better nucleation sites for monomers, polymers, and/or nanoparticles. In addition, post polymerization heating or in-situ controlled curing of polymers can be performed. Applying voltage for joule heating could also serve another function of electric field generation, which can further aid in alignment of molecules and ordering of evolving polymer chains. Confinement of polymer chains will also prevent spherulite formation and can lead to layered structure. Finally, this in situ approach can be integrated with conventional polymer processing methods. In some instances, the polymeric material is in the form of a thin film or a membrane, and, in some instances, can be anisotropic. Nano- or microstructures (e.g., a metal, a bimetallic system, an alloyed system, a metal oxide, a metal carbide, a metal or non-metal nitride, a metal dichalcogenide, or a 2D nanomaterial or corresponding derivatives comprised of silicene, germanene, graphene, MXene, or phosphorene) can be embedded or dispersed in the polymeric matrix.

In some instances, the polymeric material of the present invention can be included in articles of manufacture and/or can be a pressure-sensitive adhesive, an electrode, a sensor, an actuator, a modulator, a piezoelectric system, zero Poisson ratio (ZPR) material. The article of manufacture can include an electronic device, an optical element (e.g., ophthalmic lens, a display, a window, a mirror, a liquid crystal cell, an optical detector a modulator, or a light harvester), a gas or liquid separation membrane, a catalytic membrane for catalyzing a chemical reaction, a sensor, a structural component, an energy storage device, a gas capture or storage material, or a fuel cell).

The polymeric matrix can be a thermoplastic polymeric matrix or a thermoset polymeric matrix. Thermoplastic polymers can include polyethylene terephthalate (PET), polybutylene terephthalate (PBT), poly(1,4-cyclohexylidene cyclohexane-1,4-dicarboxylate) (PCCD), glycol modified polycyclohexyl terephthalate (PCTG), poly(phenylene oxide) (PPO), polypropylene (PP), polyethylene (PE), polyvinyl chloride (PVC), polystyrene (PS), polymethyl methacrylate (PMMA), polyethyleneimine or polyetherimide (PEI) and their derivatives, thermoplastic elastomer (TPE), terephthalic acid (TPA) elastomers, poly(cyclohexanedimethylene terephthalate) (PCT), polyethylene naphthalate (PEN), polyamide (PA), polysulfone sulfonate (PSS), sulfonates of polysulfones, polyether ether ketone (PEEK), acrylonitrile butyldiene styrene (ABS), polyether ketone ketone (PEKK), polyphenylene sulfide (PPS), co-polymers thereof, or blends thereof. Thermoset polymers can include unsaturated polyester resin, a polyurethane, formaldehyde-phenolic resin, fiber reinforced phenolic resin, a urea-form-aldehyde, a diallyl-phthalate, epoxy resin, an epoxy vinyl-ester, a polyimide, a cyanate ester of polycyanurate, dicyclopentadiene, a phenolic, a benzoxazine, co-polymers thereof, a liquid crystal thermoset polymer, or blends thereof.

Methods of making the polymeric material of the present invention are also disclosed. One method can include: (a) impregnating an electrically conductive nanostructured template with a precursor composition that includes (i) polymerizable monomers, pre-polymers, or polymers, a combination thereof, or (ii) a polymer melt; and (b) applying a voltage across the electrically conductive nanostructured template to heat the nanostructured template though resistive Joule heating. Such heating can convert the precursor composition into a polymeric matrix having an ordered arrangement of nanoscale polymeric crystalline phase domains and an ordered arrangement of nanoscale polymeric amorphous phase domains. The electrically conductive nanostructured template can include an arrangement of nanostructures described above. The nanostructured template can include a conductive metal or metal oxide thereof, or a conductive carbon-containing material. The conductive metal or metal oxide thereof can include silver, gold, zinc, indium, tin, palladium, platinum, nickel, copper, silicon, cobalt, iron, or any combination or alloy thereof. The conductive carbon-containing compound can be graphene or derivatives thereof, carbon nanotubes or derivatives thereof, electrically conductive 2D metal carbides, or any combination thereof. In some instances, the heating temperature of the electrically conductive nanostructured template in step (b) is tunable by modifying the amount of voltage applied across the template or by conductive nanostructured template volume fraction, size, spatial density, and type and wherein modifying the heating temperature allows for tuning the amount of and/or size as well as ordering and/or arrangement of the crystalline and amorphous domains. The ordered arrangement of nanoscale polymeric crystalline phase domains are positioned closer to the electrically conductive nanostructures of the template when compared with the ordered arrangement of nanoscale polymeric amorphous phase domains. In some aspects, a portion or all of the nanostructured template can be etched from the formed polymeric matrix to create an ordered arrangement of voids, which, in some instances, can extend through the entire thickness of the polymeric matrix. The ordered arrangement of voids have a tortuosity ranging from 0 to approach infinity, or 10,000,000 or more, or 100 or more, preferably 0.5 to 1.5. Modifying the design of the nanostructured template can allow tuning of the tortuosity of the voids. The method further includes (1) adding a particle forming precursor material onto the electrically conductive nanostructured template and/or into the precursor composition prior to or during step (a) and converting the particle forming precursor material into particles in step (b) through resistive Joule heating of the nanostructured template; and/or (2) adding nano- or microstructures to the precursor composition prior to or during step (a), and embedding or dispersing the nano- or microstructures into the polymeric matrix during step (b) through resistive Joule heating of the nanostructured template. These particles and/or embedded or dispersed nano- or microstructures can be partially or fully etched away to create void spaces in the polymeric matrix to form a porous polymeric matrix having an ordered arrangement of nanoscale polymeric crystalline phase domains and an ordered arrangement of nanoscale polymeric amorphous phase domains. The embedded nano- or microstructures can, in certain instances, have a core/shell or yolk/shell or hollow shell structure. In addition, the electrically conductive nanostructured template can be partially or fully etched away such that the polymeric matrix has at least two or three different void structures, a first based on the etched particles obtained from the particle forming precursor material, a second based on the etched embedded or dispersed nano- or microstructures, and/or a third based on the etched electrically conductive nanostructured template. The particle forming precursor material or the nano- or microstructures can include a metal, a metal ion, metal salt, a metal oxide, a metal nitrate, a metal hydroxide, a metal acetate, or an alkyl oxide of a metal oxide. The metal can be a transition metal including but not limited to silver, gold, copper, or nickel, platinum, palladium, chromium, tin, iron, rhodium, iridium, cobalt or any combination thereof and/or is capable of catalyzing an oxidative coupling of methane reaction, a hydrogenation reaction, a hydrocarbon cracking reaction, an alkylation reaction, a denitrogenation reaction, a desulfurization reaction, a Fischer-Tropsch reaction, a syngas production reaction, a 3-way automobile catalysis reaction, reformation reactions, hydrogen generation reaction. In some aspects, the precursor composition can include a monomer that polymerizes in step (b) to form a thermoplastic polymeric matrix or to form a thermoset polymeric matrix. The polymer can be any one or a combination of the thermoplastic polymer or blend thereof or a thermoset polymer or a blend thereof, or a liquid crystal thermoset polymer or blend thereof described above.

In the context of the present invention, 56 embodiments are described. The first embodiment includes a polymeric material comprising a polymeric matrix having an ordered arrangement of nanoscale polymeric crystalline phase domains and an ordered arrangement of nanoscale polymeric amorphous phase domains. Embodiment 2 is the polymeric material of embodiment 1, wherein the polymeric matrix is porous. Embodiment 3 is the polymeric material of embodiment 2, wherein the porous polymeric matrix includes an ordered arrangement of void spaces that extends through the entire thickness of the polymeric matrix. Embodiment 4 is the polymeric material of embodiment 3, wherein the ordered arrangement of voids are channels having a tortuosity ranging from about 0 to approaching infinity, 10,000,000 or more, 100 or more, preferably 0.5 to 1.5. Embodiment 5 is the polymeric material of any one of embodiments 3 to 4, wherein the ordered arrangement of void spaces represents areas where an electrically conductive nanostructured template has been partially or fully etched away from the matrix. Embodiment 6 is the polymeric material of embodiment 5, wherein the electrically conductive nanostructured template comprises an arrangement of nanostructures. Embodiment 7 is the polymeric material of embodiment 6, wherein the nanostructures are nanowires, nanotubes nanorods, nanospike, nanofibers, nanodisks, nanospheres, nanoellipsoid, nanoballs, nanograss, nanoflower or any combination thereof. Embodiment 8 is the polymeric material of any one of embodiments 6 to 7, wherein the nanostructures are vertically aligned, are slanted, or form a triangle-like shape, flower-like shape, grass-like shape, gyroid shape, flagella-like shape, hair-like shape, seaweed-like shape, or sea urchin-like shape, preferably, triangle-like shape. Embodiment 9 is the polymeric material of embodiment 8, wherein nanostructures form triangle-like shapes, and wherein the regions between the nanowires result in the nanoscale polymeric crystalline phase domains. Embodiment 10 is the polymeric material of any one of embodiments 6 to 7, wherein nanostructures are randomly oriented. Embodiment 11 is the polymeric material of embodiment 1, wherein the polymeric matrix further comprises an electrically conductive nanostructured template. Embodiment 12 is the polymeric material of embodiment 11, wherein the electrically conductive nanostructured template comprises an arrangement of nanostructures. Embodiment 13 is the polymeric material of embodiment 12, wherein nanostructures are nanowires, nanotubes, nanorods, nanospike, nanofibers, nanodisks, nanospheres, nanoellipsoid, nanoballs, nanograss, nanoflower, or any combination thereof. Embodiment 14 is the polymeric material of any one of embodiments 12 to 13, wherein the nanostructures are vertically aligned, are slanted, or form a triangle-like shape, a flower-like shape, a grass-like shape, a gyroid shape, a flagella-like shape, a hair-like shape, seaweed-like shape, or sea urchin-like shape, preferably triangle-like shape. Embodiment 15 is the polymeric material of any one of embodiments 12 to 13, wherein the nanostructures are randomly oriented. Embodiment 16 is the polymeric material of any one of embodiments 12 to 15, wherein the electrically conductive nanostructured template is partially etched where the etched portion represents an ordered arrangement of voids that extend through the entire thickness of the polymeric matrix. Embodiment 17 is the polymeric material of embodiment 16, wherein the ordered arrangement of voids are channels having a tortuosity ranging from about 0 to approaching infinity, 10,000,000 or more, 100 or more, preferably 0.5 to 1.5. Embodiment 18 is the polymeric material of embodiment 1, wherein the ordered arrangements of nanoscale polymeric crystalline phase domains and nanoscale polymeric amorphous phase domains are the reaction product of resistive Joule heating of an electrically conductive nanostructured template and a precursor composition comprising (i) polymerizable monomers, pre-polymers, or polymers, a combination thereof, or (ii) a polymer melt. Embodiment 19 is the polymeric material of any one of embodiments 1 to 18, wherein the polymeric matrix is a thermoplastic polymeric matrix. Embodiment 20 is the polymeric material of embodiment 19, wherein the thermoplastic polymer is polyethylene terephthalate (PET), polybutylene terephthalate (PBT), poly (1,4-cyclohexylidene cyclohexane-1,4-dicarboxylate) (PCCD), glycol modified polycyclohexyl terephthalate (PCTG), poly(phenylene oxide) (PPO), polypropylene (PP), polyethylene (PE), polyvinyl chloride (PVC), polystyrene (PS), polymethyl methacrylate (PMMA), polyethyleneimine or polyetherimide (PEI) and their derivatives, thermoplastic elastomer (TPE), terephthalic acid (TPA) elastomers, poly (cyclohexanedimethylene terephthalate) (PCT), polyethylene naphthalate (PEN), polyamide (PA), polysulfone sulfonate (PSS), sulfonates of polysulfones, polyether ether ketone (PEEK), acrylonitrile butyldiene styrene (ABS), polyether ketone ketone (PEKK), polyphenylene sulfide (PPS), co-polymers thereof, or blends thereof. Embodiment 21 is the polymeric material of any one of embodiments 1 to 20, wherein the matrix is a thermoset polymeric matrix. Embodiment 22 is the polymeric material of embodiment 21, wherein the thermoset polymer is an unsaturated polyester resin, a polyurethane, formaldehyde-phenolic resin, fiber reinforced phenolic resin, a urea-formaldehyde, a diallyl-phthalate, epoxy resin, an epoxy vinylester, a polyimide, a cyanate ester of polycyanurate, dicyclopentadiene, a phenolic, a benzoxazine, co-polymers thereof, a liquid crystal thermoset polymer, or blends thereof. Embodiment 23 is the polymeric material of any one of embodiment 1 to 22, wherein the material is in the form of a thin film or a membrane. Embodiment 24 is the polymeric material of any one of embodiments 1 to 23, further comprising nano- or microstructures embedded or dispersed in the polymeric matrix. Embodiment 25 is the polymeric material of embodiment 24, wherein the nano- or microstructure comprises a metal, multimetallic compounds, an alloy, a metal oxide, a metal carbide, a metal or non-metal nitride, a metal dichacolgenide, or a 2D nanomaterial or corresponding derivatives comprised of silicene, germanene, graphene, or phosphorene. Embodiment 26 is the polymeric material of any one of embodiments 1 to 25, wherein the material is anisotropic.

Embodiment 27 is an article of manufacture comprising the polymeric material of any one of embodiments 1 to 26. Embodiment 28 is the article of manufacture of embodiment 27, wherein the article of manufacture is an electronic device, an optical element, a gas or liquid separation membrane, a catalytic membrane for catalyzing a chemical reaction, a sensor, a structural component, an energy storage device, a gas capture or storage material, or a fuel cell. Embodiment 29 is the article of manufacture of embodiment 28, wherein the optical element is an ophthalmic lens, a display, a window, a mirror, a liquid crystal cell, an optical detector a modulator, or a light harvester. Embodiment 30 is the article of manufacture of embodiment 29, wherein the article of manufacture is a pressure-sensitive adhesive, an electrode, a sensor, an actuator, a modulator, a piezoelectric system, zero Poisson ratio (ZPR) material.

Embodiment 31 is a method for making the polymeric material of any one of embodiments 1 to 26, the method comprising: (a) impregnating an electrically conductive nanostructured template with a precursor composition comprising (i) polymerizable monomers, pre-polymers, or polymers, a combination thereof, or (ii) a polymer melt; and (b) applying a voltage across the electrically conductive nanostructured template to heat the nanostructured template though resistive Joule heating, wherein the heat converts the precursor composition into a polymeric matrix having an ordered arrangement of nanoscale polymeric crystalline phase domains and an ordered arrangement of nanoscale polymeric amorphous phase domains. Embodiment 32 is the method of embodiment 31, wherein the electrically conductive nanostructured template comprises an arrangement of nanostructures. Embodiment 33 is the method of embodiment 32, wherein the arrangement of nanostructures are nanowires, nanotubes, nanorods, nanospike, nanofibers, nanodisks, nanospheres, nanoellipsoid, nanoballs, nanograss, nanoflower, or any combination thereof. Embodiment 34 is the method of any one of embodiments 32 to 33, wherein the nanostructures are vertically aligned, slanted, or form a triangle-like shape, flower-like shape, grass-like shape, gyroid shape, flagella-like shape, hair-like shape, seaweed-like shape, or sea urchin-like shape, preferably triangle-like shape. Embodiment 35 is the method of any one of embodiments 32 or 33, wherein the nanostructures are randomly oriented. Embodiment 36 is the method of any one of embodiments 31 to 35, wherein the nanostructured template comprises a conductive metal or metal oxide thereof, or a conductive carbon-containing material. Embodiment 37 is the method of embodiment 36, wherein the conductive metal or metal oxide thereof comprises silver, gold, zinc, indium, tin, palladium, platinum, nickel, copper, silicon, cobalt, iron, any combination thereof, and alloy thereof. Embodiment 38 is the method of embodiment 37, wherein the conductive carbon-containing compound is graphene or derivatives thereof, carbon nanotubes or derivatives thereof, electrically conductive 2D metal carbides, or any combination thereof. Embodiment 39 is the method of any one of embodiments 31 to 38, wherein the heating temperature of the electrically conductive nanostructured template in step (b) is tunable by modifying the amount of voltage applied across the template or the conductive nanostructured template volume fraction, size, and type, and wherein modifying the heating temperature allows for tuning the amount of and/or size of the crystalline and amorphous domains. Embodiment 40 is the method of any one of embodiments 31 to 39, wherein the ordered arrangement of nanoscale polymeric crystalline phase domains are positioned closer to the electrically conductive nanostructures of the template when compared with the ordered arrangement of nanoscale polymeric amorphous phase domains. Embodiment 41 is the method of embodiment 40, wherein the ordered arrangement of nanoscale polymeric crystalline phase domains are between at least two of the electrically conductive nanostructures of the template, preferably between three or four, or more electrically conductive nanostructures. Embodiment 42 is the method of any one of embodiments 31 to 41, further comprising partially or fully etching away the nanostructured template from the formed polymeric matrix to create an ordered arrangement of void spaces. Embodiment 43 is the method of embodiment 42, wherein the ordered arrangement of void spaces extends through the entire thickness of the polymeric matrix. Embodiment 44 is the method of any one of embodiments 42 to 43, wherein the ordered arrangement of void spaces have a tortuosity ranging from about 0 to approaching infinity, 10,000,000 or more, 100 or more, preferably 0.5 to 1.5. Embodiment 45 is the method of embodiment 44, wherein the tortuosity of the void spaces can be tuned by modifying the design, architecture, or morphology of the nanostructured template. Embodiment 46 is the method of any one of embodiments 31 to 45, further comprising: (1) adding a nano- or mictrostructure forming precursor material onto the electrically conductive nanostructured template and/or into the precursor composition prior to or during step (a) and converting the precursor material into nano- or microstructures in step (b) through resistive Joule heating of the nanostructured template; and/or (2) adding nano- or microstructures to the precursor composition prior to or during step (a), and embedding or dispersing the nano- or microstructures into the polymeric matrix during step (b) through resistive Joule heating of the nanostructured template. Embodiment 47 is the method of embodiment 46, further comprising partially or fully etching away the nano- and or microstructures to create void spaces in the polymeric matrix. Embodiment 48 is the method of embodiment 47, further comprising partially or fully etching away the electrically conductive nanostructured template such that the polymeric matrix has at least two or three different void structures, a first based on the etched nano- or microstructures obtained from the precursor material, a second based on the etched embedded or dispersed nano- or microstructures, and/or a third based on the etched electrically conductive nanostructured template. Embodiment 49 is the method of any one of embodiments 46 to 48, wherein the particle forming precursor material or the nano- or microstructures comprise(s) a metal, a metal salt, a metal oxide, a metal nitrate, a metal hydroxide, a metal acetate, or an alkyl oxide of a metal oxide. Embodiment 50 is the method of embodiment 49, wherein the metal is a transition metal including but not limited to silver, gold, copper, or nickel, platinum, palladium, chromium, tin, iron, rhodium, iridium, cobalt or any combination thereof. Embodiment 51 is the method of embodiment 50, wherein the metal is capable of catalyzing an oxidative coupling of methane reaction, a hydrogenation reaction, a hydrocarbon cracking reaction, an alkylation reaction, a denitrogenation reaction, a desulfurization reaction, a Fischer-Tropsch reaction, a syngas production reaction, a 3-way automobile catalysis reaction, reformation reactions, hydrogen generation reaction. Embodiment 52 is the method of any one of embodiments 31 to 51, wherein the precursor composition comprises a monomer that polymerizes in step (b) to form a thermoplastic polymeric matrix. Embodiment 53 is the method of any one of embodiments 31 to 52, wherein the precursor composition comprises a monomer that polymerizes in step (b) to form a thermoset polymeric matrix. Embodiment 54 is the method of any one of embodiments 31 to 51, wherein the precursor composition comprises a thermoplastic polymer or blend thereof or a thermoset polymer or a blend thereof, or a liquid crystal thermoset polymer or blend thereof. Embodiment 55 is the method of any one of embodiments 52 or 54, wherein the thermoplastic polymeric matrix includes a polymer selected from polyethylene terephthalate (PET), polybutylene terephthalate (PBT), poly(1,4-cyclohexylidene cyclohexane-1,4-dicarboxylate) (PCCD), glycol modified polycyclohexyl terephthalate (PCTG), poly(phenylene oxide) (PPO), polypropylene (PP), polyethylene (PE), polyvinyl chloride (PVC), polystyrene (PS), polymethyl methacrylate (PMMA), polyethyleneimine or polyetherimide (PEI) and their derivatives, thermoplastic elastomer (TPE), terephthalic acid (TPA) elastomers, poly(cyclohexanedimethylene terephthalate) (PCT), polyethylene naphthalate (PEN), polyamide (PA), polysulfone sulfonate (PSS), sulfonates of polysulfones, polyether ether ketone (PEEK), acrylonitrile butyldiene styrene (ABS), polyether ketone ketone (PEKK), polyphenylene sulfide (PPS), co-polymers thereof, or blends thereof. Embodiment 55 is the method of any one of embodiments 53 or 54, wherein the thermoset polymeric matrix includes a polymer selected from an unsaturated polyester resin, a polyurethane, bakelite, fiber reinforced phenolic resins, urea-formaldehyde, diallylphthalate, epoxy resin, an epoxy vinylester, a polyimide, a cyanate ester of polycyanurate, dicyclopentadiene, a phenolic, a benzoxazine, co-polymers thereof, or blends thereof.

The following includes definitions of various terms and phrases used throughout this specification.

"Tortousity" is defined the ratio of the length of the pore (L) to the distance between the ends of it (C, membrane thickness) or Tortuosity=L/C. This ratio equals 1 for a straight line. See, Hinds et al., *Science,* 2004, 303:62-65.

The phrase "crystalline domain" refers to a crystalline region in the solid state of a polymer. The phrase "amorphous domains" refers to a noncrystalline region in the solid state of a polymer. Amorphous domains are characterized by the absence of long-range order. The degree of crystallinity can be determined by (i) x-Ray diffraction, (ii) calorimetry, (iii) density measurements, and (iv) infra-red spectroscopy (IR). See, *International Union of Pure and Applied Chemistry,* 1989, 61:769-765.

"Nanostructure" refers to an object or material in which at least one dimension of the object or material is equal to or less than 100 nm (e.g., one dimension is 1 to 100 nm in size). In a particular aspect, the nanostructure includes at least two dimensions that are equal to or less than 100 nm (e.g., a first dimension is 1 to 100 nm in size and a second dimension is 1 to 100 nm in size). In another aspect, the nanostructure includes three dimensions that are equal to or less than 100 nm (e.g., a first dimension is 1 to 100 nm in size, a second dimension is 1 to 100 nm in size, and a third dimension is 1 to 100 nm in size). The shape of the nanostructure can be of a wire, a ribbon, a particle, a sphere, a rod, a tetrapod, a hyperbranched structure, or mixtures thereof.

"Microstructure" refers to an object or material in which at least one dimension of the object or material is equal to or less than 1000 microns and greater than 100 nm (e.g., one dimension is greater than 100 nm and less than 1000 microns in size). In a particular aspect, the microstructure includes at least two dimensions that are equal to or less than 1000 microns and greater than 100 nm (e.g., a first dimension is greater than 100 nm and less than 1000 microns in size and a second dimension is greater than 100 nm and less than 1000 microns in size). In another aspect, the microstructure includes three dimensions that are equal to or less than 1000 microns and greater than 100 nm (e.g., a first dimension is greater than 100 nm and less than 1000 microns in size, a second dimension is greater than 100 nm and less than 1000 microns in size, and a third dimension is greater than 100 nm and less than 1000 microns in size). The shape of the microstructure can be of a wire, a ribbon, a particle, a sphere, a rod, a tetrapod, a hyperbranched structure, or mixtures thereof.

The term "about" or "approximately" are defined as being close to as understood by one of ordinary skill in the art. In one non-limiting embodiment, the terms are defined to be within 10%, preferably within 5%, more preferably within 1%, and most preferably within 0.5%.

The term "substantially" and its variations are defined to include ranges within 10%, within 5%, within 1%, or within 0.5%.

The terms "inhibiting" or "reducing" or "preventing" or "avoiding" or any variation of these terms, when used in the claims and/or the specification includes any measurable decrease or complete inhibition to achieve a desired result.

The term "effective," as that term is used in the specification and/or claims, means adequate to accomplish a desired, expected, or intended result.

The terms "wt. %", "vol. %", or "mol. %" refers to a weight, volume, or molar percentage of a component, respectively, based on the total weight, the total volume of material, or total moles, that includes the component. In a non-limiting example, 10 grams of component in 100 grams of the material is 10 wt. % of component.

The use of the words "a" or "an" when used in conjunction with any of the terms "comprising", "including", "containing", or "having" in the claims, or the specification, may mean "one," but it is also consistent with the meaning of "one or more", "at least one", and "one or more than one."

The words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The polymeric materials or matrices of the present invention can "comprise," "consist essentially of," or "consist of" particular ingredients, components, compositions, etc. disclosed throughout the specification. With respect to the transitional phase "consisting essentially of," in one non-limiting aspect, a basic and novel characteristic of the polymeric materials or matrices of the present invention are that they have an ordered arrangement of nanoscale polymeric crystalline phase domains and an ordered arrangement of nanoscale polymeric amorphous phase domains.

Other objects, features and advantages of the present invention will become apparent from the following figures, detailed description, and examples. It should be understood, however, that the figures, detailed description, and examples, while indicating specific embodiments of the invention, are given by way of illustration only and are not meant to be limiting. Additionally, it is contemplated that changes and modifications within the spirit and scope of the invention will become apparent to those skilled in the art from this detailed description. In further embodiments, features from specific embodiments may be combined with features from other embodiments. For example, features from one embodiment may be combined with features from any of the other embodiments. In further embodiments, additional features may be added to the specific embodiments described herein.

BRIEF DESCRIPTION OF THE DRAWINGS

Advantages of the present invention may become apparent to those skilled in the art with the benefit of the following detailed description and upon reference to the accompanying drawings.

Figure 1:
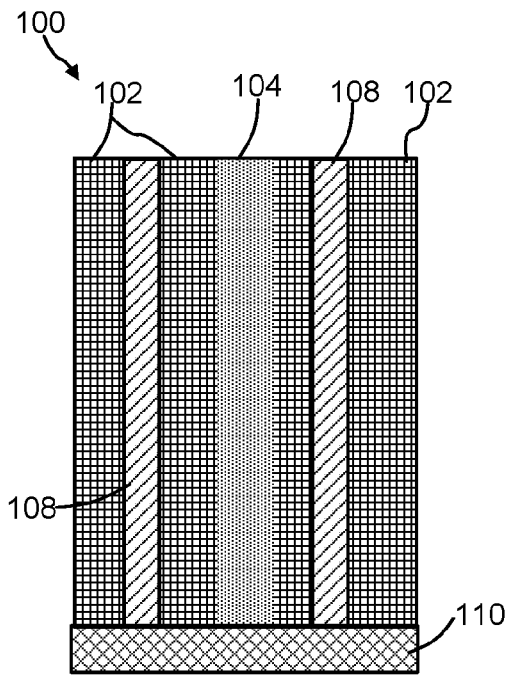
FIG. 1 is a cross-sectional illustration of the polymeric material of the present invention.

While the invention is susceptible to various modifications and alternative forms, specific embodiments thereof are shown by way of example in the drawings and may herein be described in detail. The drawings may not be to scale.

DETAILED DESCRIPTION OF THE INVENTION

A polymeric material has been discovered in the context of the present invention that includes an ordered arrangements of crystalline domains and ordered arrangements of amorphous domains. Notably, the invention demonstrates a new multifunctional and an ordered nano-architectural polymeric material that includes polymers and inorganic nanostructures. These types of polymeric materials can be tuned for use in various mechanical, energy, optical or chemical applications, or articles of manufacture. The invention also provides for methods of making the polymeric material of the present invention. Such a method provides an elegant approach for nanometer scale control of temperature or gradients during the polymerization process, which can solve or eliminate the problems associated with bulk heating of the polymerizing components (or monomers).

These and other non-limiting aspects of the present invention are discussed in further detail in the following sections with references to the figures.

A. Polymeric Material

Figure 2:
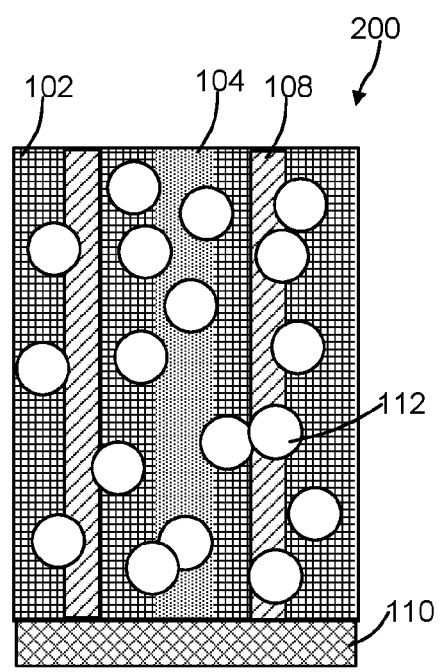
FIG. 2 is a cross-sectional illustration of the polymeric material of the present invention with nanostructures.
Figure 3:
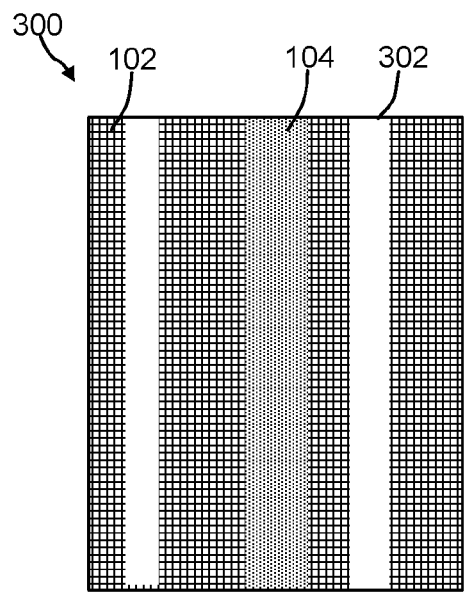
FIG. 3 is a cross-sectional illustration of the polymeric material of the present invention having void spaces.
Figure 4:
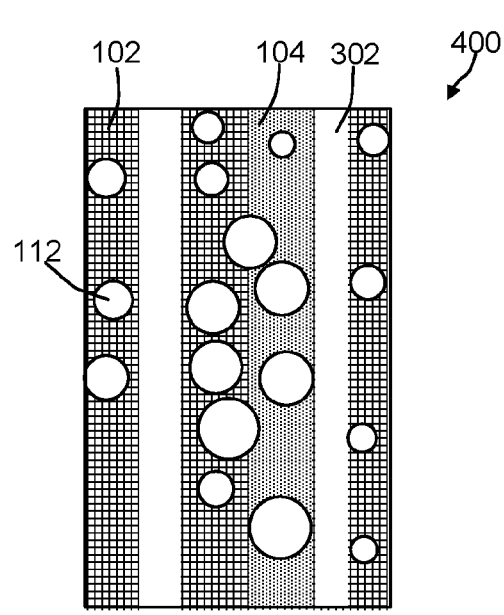
FIG. 4 is a cross-sectional illustration of the polymeric material of the present invention having void spaces and nanostructures.
Figure 5:
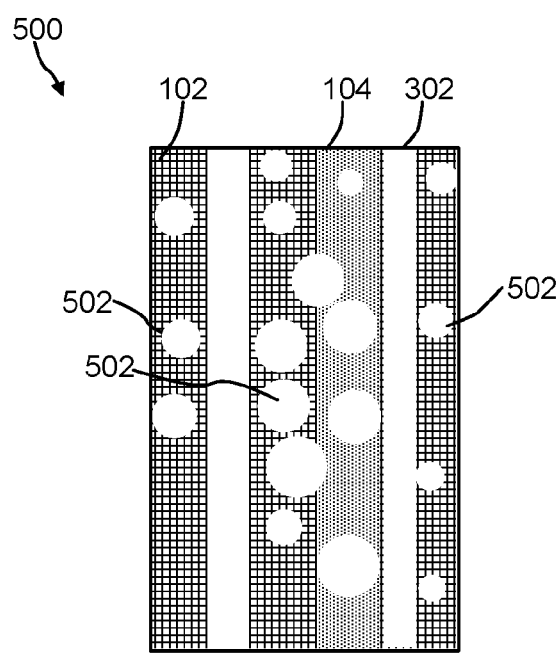
FIG. 5 is a cross-sectional illustration of the polymeric material of the present invention having additional void spaces created by the removal of nano- or microstructures.

The polymeric material of the present invention include a polymeric matrix that has an ordered arrangement (or array) of nanoscale polymeric crystalline phase domains and an ordered arrangement of nanoscale polymeric amorphous phase domains. The crystalline phase domains and amorphous phase domains can be any size or shape. FIGS. 1-4 are cross-sectional illustrations of the polymeric material. Referring to FIG. 1, the polymeric material 100 includes the crystalline phase domains 102, the amorphous domains 104, and an electrically conductive nanostructured template 106 (See, FIG. 5). While only three ordered arrangements or arrays of crystalline domains and only one ordered arrangement or array of an amorphous domain is shown in FIG. 1, it is contemplated that a number of ordered crystalline 102 and amorphous domains 104 can be incorporated into a given polymeric material by selecting a desired nanostructured template 106. Crystalline domains 102 are believed to form more closely to template 106, whereas the amorphous domains 104 are believed to form further away from template 106. Electrically conductive nanostructured template 106 includes electroconductive nanomaterials 108 and support 110. FIG. 2 is a cross-sectional illustration of the polymeric material 200 with nanostructures 112 dispersed or embedded throughout the polymeric material 200. As shown, the nanostructures 112 are spherical in shape, but it should be understood they can be any shape or size (e.g., a ribbon, a rod, a wire, a tube, a tetrapod, a hyperbranched structure, etc.). Referring to FIGS. 3 and 4, the polymeric material 300 includes an ordered arrangement of void spaces (voids) 302 in addition to crystalline phase domains 102 and amorphous domains 104. In FIG. 4, polymeric material 400 also includes nanostructures 112. The ordered arrangement of void spaces 302 can extend partially or through the entire thickness of the polymeric matrix. Referring to FIG. 5, polymeric material 500 can include an ordered arrangement of void spaces 502 where nano- or microstructures 112 have been removed from the polymeric matrix in addition to crystalline phase domains 102, the amorphous domains 104, and the ordered arrangement of void spaces 302. In some embodiments, the ordered arrangement of void spaces are channels having a tortuosity, assuming a square cross-section or cubical volume, ranging from about 0 to approaching infinity, 10,000,000 or more, 100 or more, preferably 0.5 to 1.5, or 0.1, 0.2, 0.3, 0.4, 0.5, 0.6, 0.7, 0.8, 0.9, 1.0, 1.1, 1.2, 1.3, 1.4, 1.5, 2, 5, 10, 20, 30, 40, 50, 60, 70, 80, 90, 100 or any range or value there between. The size or dimensions of the void spaces can be span the nano, meso, micro or macro ranges. The void spaces can have any shape or size and can reflect the shape or size of a corresponding nanostructure. For example, an arrangement of flower-shaped nanostructures can be removed to form tortuous channels. As shown, the voids are vertically aligned, however other shapes of voids (e.g., a slanted, polygonal shape, triangle-like shape, flower-like, grass-like, gyroid, flagella-like, hair-like, seaweed-like, or sea urchin-like morphology) are contemplated. In structures 100 and 200, template nanowires 108 can be left inside the porous polymer membrane to enable a heating process during a chemical reaction that takes place on the polymer surface or within the matrix.

1. Electrically Conductive Template

Electrically conductive template 106 can include nanomaterials 108 and support 110. Electrically conductive nanostructured templates 106 can be made through known processes or obtained from a commercial vendor. Non-limiting examples of vendors include Sigma-Aldrich® (USA), VWR International (USA), Fischer Scientific (USA), Cheap Tubes, Inc. (USA), Angstron Materials, Inc. (USA), Plasmaterials, Inc. (USA), and MTI Corporation (USA). Known processes to make electrically conductive nanostructured templates include the use of ZnO grass architectures, randomly dispersed ITO nanowires, or vertically aligned Si nanowires through solution processes or through a process described in U.S. Patent Application Publication No. 2015/0037517 to Buriak et al. In a non-limiting example, electrically conductive nanostructured templates can be made through the growth of templates in a bulk solution. For example, solution growth of ZnO grass architectures, randomly dispersed ITO nanowires, or vertically aligned Si nanowires. Specifically, the growth of vertically aligned silicon nanowires can be achieved in a scalable manner using wet-chemistry technique. A clean silicon substrate, preferably a silicon wafer, can be immersed in a solution of diluted (10-80%) hydrofluoric acid and precious metal salt (0.1 mM to 1 M). This step can enable nanometer scale particles of precious metal form (nanomasks) on the surface of silicon substrate and initiate an electrolytic reaction resulting in etching of silicon around the nanomask, thereby leading to the formation of vertically standing silicon nanowires. The precious metal nanomasks can be removed by shaking of ultrasonication method leaving behind clean and vertically aligned silicon nanowires.

The electroconductive materials in the template can be any shape or size and be secured to support 110 in a designed arrangement. Non-limiting examples of arrangements or arrays include nanowires, nanotubes nanorods, nanospike, nanofibers, nanodisks, nanospheres, nanoellipsoid, nanoballs, nanograss, nanoflower or any combination thereof. The orientation of the nanostructures in the arrangement can be random, ordered, vertical, slanted, or any combination thereof. In some instance, the nanostructures can have any shape or morphology. Non-limiting examples of shapes include polygonal shape, a square shape, a triangle-like shape, a flower-like shape, a grass-like shape, a gyroid shape, a flagella-like morphology, hair-like, a seaweed-like morphology, or a sea urchin-like morphology or the like. The spatial density and architecture of the templates of nanomaterials 108 can be designed such that temperature gradients in the polymeric matrix are controlled within a range of 10 to 100 nm. The design of the template and subsequent removal of the electrically conductive nanostructures can form channels (e.g., torturous channels or straight channels). Such architectural design allows for tunability of the polymeric matrix, the order of chain orientation during polymerization or curing, domain size, domain composition, and porosity of the polymeric matrix.

Notably, the ordered crystalline and amorphous domains can be arranged to have a similar pattern to the nanostructured template. Thus, the polymeric materials of the present invention can have "an ordered arrangement of nanoscale polymeric crystalline phase domains and an ordered arrangement of nanoscale polymeric amorphous phase domains". The reason for this similarity is the resistive Joule heating of the template allows for the crystalline domains to form closer to the template (due to being subjected to higher temperatures), whereas the amorphous domains form further away from the template (due to being subjected to lower temperatures). The degree of crystallization increases with an increasing temperature gradient between the nanostructure template. Thus, the shape of a given nanostructured template can be used to control the shapes and numbers of crystalline and amorphous phase domains. For example, three nanowires forming a triangle can result in intense temperature gradients that can result in more crystalline regions than open nanowire junctions and networks. Additionally, the spatial density of nanostructured templates could determine the size of the ordered crystalline and amorphous domains, which could range from nano to micro regime.

2. Polymers

The polymeric matrix can be made from any polymer or polymer precursor capable of being cross-linked or polymerized when exposed to heat. The polymers and polymer precursors are available from commercial vendors or made according to conventional chemical reactions. In some embodiments, the polymer is a thermoset polymer, a liquid crystal thermoset polymer or blend thereof. The polymer matrix can be made from a composition having a thermoplastic polymer and can also include other non-thermoplastic polymers, additives, and the like, that can be added to the composition.

Thermoset polymeric matrices are cured or become cross-linked and tend to lose the ability to become pliable or moldable at raised temperatures. Non-limiting examples of thermoset polymers used to make the polymer film include epoxy resins, epoxy vinyl esters, alkyds, amino-based polymers (e.g., polyurethanes, urea-formaldehyde), diallyl phthalate, phenolics polymers, polyesters, unsaturated polyester resins, dicyclopentadiene, polyimides, silicon polymers, cyanate esters of polycyanurates, thermosetting polyacrylic resins, phenol formaldehyde resin (bakelite), fiber reinforced phenolic resins (Duroplast), benzoxazines, or co-polymers thereof, or blends thereof. In addition to these, other thermoset polymers known to those of skill in the art, and those hereinafter developed, can also be used in the context of the present invention. The thermoset polymer can be included in a composition that includes said polymer and additives. Non-limiting examples of additives include coupling agents, antioxidants, heat stabilizers, flow modifiers, etc., or any combinations thereof. In some embodiments, one or more monomers capable of being polymerized when exposed to heat, light or electromagnetic force are used. Such monomers can be precursor materials suitable for forming thermoset polymers. The polymers monomers are available from commercial vendors or made according to conventional chemical reactions.

Thermoplastic polymeric matrices have the ability to become pliable or moldable above a specific temperature and solidify below the temperature. The polymeric matrix of the material can include thermoplastic or thermoset polymers, co-polymers thereof, and blends thereof that are discussed throughout the present application. Non-limiting examples of thermoplastic polymers include polyethylene terephthalate (PET), a polycarbonate (PC) family of polymers, polybutylene terephthalate (PBT), poly(1,4-cyclohexylidene cyclohexane-1,4-dicarboxylate) (PCCD), glycol modified polycyclohexyl terephthalate (PCTG), poly(phenylene oxide) (PPO), polypropylene (PP), polyethylene (PE), high density polyethylene, low density poly ethylene, polyvinyl chloride (PVC), polystyrene (PS), polymethyl methacrylate (PMMA), polyethyleneimine or polyetherimide (PEI) and their derivatives, thermoplastic elastomer (TPE), terephthalic acid (TPA) elastomers, poly(cyclohexanedimethylene terephthalate) (PCT), polyethylene naphthalate (PEN), polyamide (PA), polysulfone sulfonate (PSS), sulfonates of polysulfones, polyether ether ketone (PEEK), polyether ketone ketone (PEKK), acrylonitrile butyldiene styrene (ABS), polyphenylene sulfide (PPS), co-polymers thereof, or blends thereof. In addition to these, other thermoplastic polymers known to those of skill in the art, and those hereinafter developed, can also be used in the context of the present invention. In some aspects of the invention, the preferred thermoplastic polymers include polypropylene, polyamide, polyethylene terephthalate, a polycarbonate (PC) family of polymers, polybutylene terephthalate, poly(phenylene oxide) (PPO), polyetherimide, polyethylene (high and low density polyethylene), co-polymers thereof, or blends thereof. In more preferred aspects, the thermoplastic polymers include polypropylene, polyethylene, polyamide, a polycarbonate (PC) family of polymers, co-polymers thereof, or blends thereof. The thermoplastic polymer can be included in a composition that includes said polymer and additives. Non-limiting examples of additives include coupling agents, antioxidants, heat stabilizers, flow modifiers, colorants, reactive diluents, etc., or any combinations thereof. Polymers or polymer precursors can be obtained from various commercial sources. A non-limiting example of commercial source is SABIC® (Saudi Basic Industries Corporation, Saudi Arabia) sold under the tradenames of SABIC® HDPE F00952, SABIC® PET BC111, SABIC® PP 520L, SABIC® LDPE HP0823, and SABIC® ULTEM™ Resin 1000.

3. Electrically Conductive Materials and Nano- or Microstructures

Electrically conductive nanostructured materials, nano- or microstructures include structures having a variety of shapes and/or made from a variety of materials. The electrically conductive nanostructured materials can have the shapes, sizes or be arranged as described above. The nano- or microstructures materials can have the shape of a wire, a particle (e.g., having a substantially spherical shape), a rod, a tetrapod, a hyper-branched structure, a tube, a cube, a flower, an ellipsoid, ball, disk, or mixtures thereof. Selection of a desired shape or size of the electrically conductive nanostructured materials or the nano- or microstructures can allow tunability or modification the shape of void spaces 112, the crystalline domains and/or the amorphous domains.

a. Electrically Conductive Materials

The electrically conductive material can include or be made of metal, carbon or mixtures of metal and carbon. Non-limiting examples of metal include silver, gold, copper, or nickel, platinum, palladium, chromium, tin or any combination thereof. The electrically conductive can also include aluminum, bismuth, magnesium, silicon or any combination thereof. A non-limiting example of carbon includes graphene. A non-limiting example of nano- or microstructures includes silver nano-wires, silicon nano wires, zinc oxide nano wires, or combinations thereof.

b. Nano- or Microstructured Materials

Non-limiting embodiments of materials that can be used include metals, multimetallic compounds (bimetallic, trimetallic, etc.), an alloy, a metal oxide, a metal carbide, a metal or non-metal nitride, a metal dichalcogenide, or a 2D nanomaterial or corresponding derivatives that include of silicene, germanene, graphene, or phosphorene metals, alloys, metal oxides, carbon-based materials, metal organic frameworks, zeolitic imidazolated frameworks, covalent organic frameworks, and any combination thereof. Further, the nano- or micro materials can any type of shape (e.g., wire, a ribbon, a particle, a sphere, a rod, a tube, a tetrapod, a hyperbranched structure, etc.) or any type of structure (e.g., core/shell, yolk/shell, or hollow shell structure). Examples of metals include noble metals, transition metals, or any combinations or any alloys thereof. Noble metals include silver (Ag), osmium (Os), palladium (Pd), platinum (Pt), gold (Au), rhodium (Rh), ruthenium (Ru), rhenium (Re), iridium (Ir) or any combinations or alloys thereof. Transition metals include iron (Fe), copper (Cu), nickel (Ni), zinc (Zn), cobalt (Co), manganese (Mn), chromium (Cr), molybdenum (Mo), tungsten (W), or tin (Sn), or any combinations or alloys thereof. In some embodiments, the nanostructure includes 1, 2, 3, 4, 5, 6, or more transition metals and/or 1, 2, 3, 4 or more noble metals. In some embodiments, the nanostructures have a core/shell or yolk/shell type structure. The metals can be obtained from metal precursor compounds. For example, the metals can be obtained as a metal nitrate, a metal amine, a metal chloride, a metal coordination complex, a metal sulfate, a metal phosphate hydrate, metal complex, or any combination thereof. Examples of metal precursor compounds include, nickel nitrate hexahydrate, nickel chloride, cobalt nitrate hexahydrate, cobalt chloride hexahydrate, cobalt sulfate heptahydrate, cobalt phosphate hydrate, platinum (IV) chloride, ammonium hexachloroplatinate (IV), sodium hexachloroplatinate (IV) hexahydrate, potassium hexachloroplatinate (IV), or chloroplatinic acid hexahydrate. These metals or metal compounds can be purchased from any chemical supplier such as Sigma-Aldrich (St. Louis, Mo. USA), Alfa-Aeaser (Ward Hill, Mass., USA), and Strem Chemicals (Newburyport, Mass., USA). Metal oxides include silica ($SiO_2$), alumina ($Al_2O_3$), titania ($TiO_2$), zirconia ($ZrO_2$), germania ($GeO_2$), stannic oxide ($SnO_2$), gallium oxide ($Ga_2O_3$), zinc oxide (ZnO), hafnia ($HfO_2$), yttria ($Y_2O_3$), lanthana ($La_2O_3$), ceria ($CeO_2$), or any combinations or alloys thereof.

MOFs are compounds having metal ions or clusters coordinated to organic molecules to form one-, two-, or three-dimensional structures that can be porous. In general, it is possible to tune the properties of MOFs for specific applications using methods such as chemical or structural modifications. One approach for chemically modifying a MOF is to use a linker that has a pendant functional group for post-synthesis modification. Any MOF either containing an appropriate functional group or that can be functionalized in the manner described herein can be used in the disclosed carbon nanotubes Examples include, but are not limited to, IRMOF-3, MOF-69A, MOF-69B, MOF-69C, MOF-70, MOF-71, MOF-73, MOF-74, MOF-75, MOF-76, MOF-77, MOF-78, MOF-79, MOF-80, DMOF-1-$NH_2$, UMCM-1-$NH_2$, and MOF-69-80. Non-limiting examples of zeolite organic frameworks include zeolite imidazole framework (ZIFs) compounds such as ZIF-1, ZIF-2, ZIF-3, ZIF-4, ZIF-5, ZIF-6, ZIF-7, ZIF-8, ZIF-9, ZIF-10, ZIF-11, ZIF-12, ZIF-14, ZIF-60, ZIF-62, ZIF-64, ZIF-65, ZIF-67, ZIF-68, ZIF-69, ZIF-70, ZIF-71, ZIF-72, ZIF-73, ZIF-74, ZIF-75, ZIF-76, ZIF-77, ZIF-78, ZIF-79, ZIF-80, ZIF-81, ZIF-82, ZIF-86, ZIF-90, ZIF-91, ZIF-92, ZIF-93, ZIF-95, ZIF-96, ZIF-97, ZIF-100 and hybrid ZIFs, such as ZIF-7-8, ZIF-8-90. Covalent organic frameworks (COFs) are periodic two- and three-dimensional (2D and 3D) polymer networks with high surface areas, low densities, and designed structures. COFs are porous, and crystalline, and made entirely from light elements (H, B, C, N, and O). Non-limiting examples of COFs include COF-1, COF-102, COF-103, PPy-COF 3 COF-102-$C_{12}$, COF-102-allyl, COF-5, COF-105, COF-108, COF-6, COF-8, COF-10, COF-11 Å, COF-14 Å, COF-16 Å, OF-18 Å, TP-COF 3, Pc-PBBA, NiPc-PBBA, 2D-NiPc-BTDA COF, NiPc COF, BTP-COF, HHTP-DPB, COF-66, ZnPc-Py, ZnPc-DPB COF, ZnPc-NDI COF, ZnPc-PPE COF, CTC-COF, H2P-COF, ZnP-COF, CuP-COF, COF-202, CTF-1, CTF-2, COF-300, COF-LZU, COF-366, COF-42 and COF-43.

The amount of nanostructures (e.g., nanoparticles) in the polymeric material depends, inter alfa, on the use of the polymeric material. In some embodiments when the polymeric material is used as in catalytic applications, the amount of catalytic metal present in the particle(s) in the nanostructure ranges from 0.01 to 100 parts by weight of "active" catalyst structure per 100 parts by weight of polymeric material, preferably from 0.01 to 5 parts by weight of "active" catalyst structure per 100 parts by weight of polymeric material. If more than one catalytic metal is used, the molar percentage of one metal can be 1 to 99 molar % of the total moles of catalytic metals in the catalytic polymeric material.

B. Preparation of Polymeric Materials

FIGS. 6, 7A, 7B, and 7C are schematics of methods of preparing polymeric materials of the present invention having ordered arrangements of crystalline domains and amorphous domains. The methods can include one or more steps that can be used in combination to tune the polymeric material for a desired application.

Figure 6:
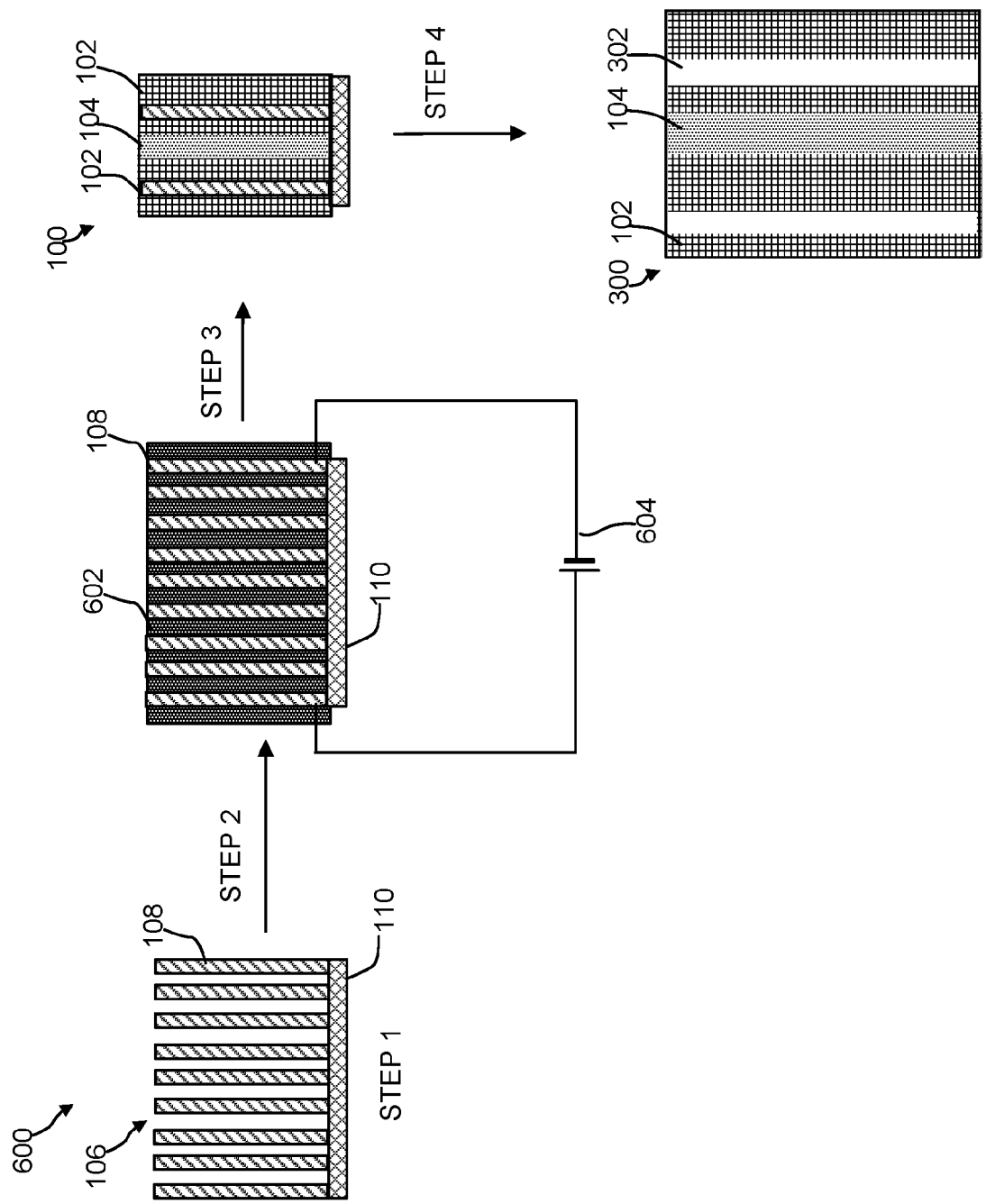
FIG. 6 is an illustration of an embodiment of a method to make the polymeric material of the present invention.
Figure 7A:
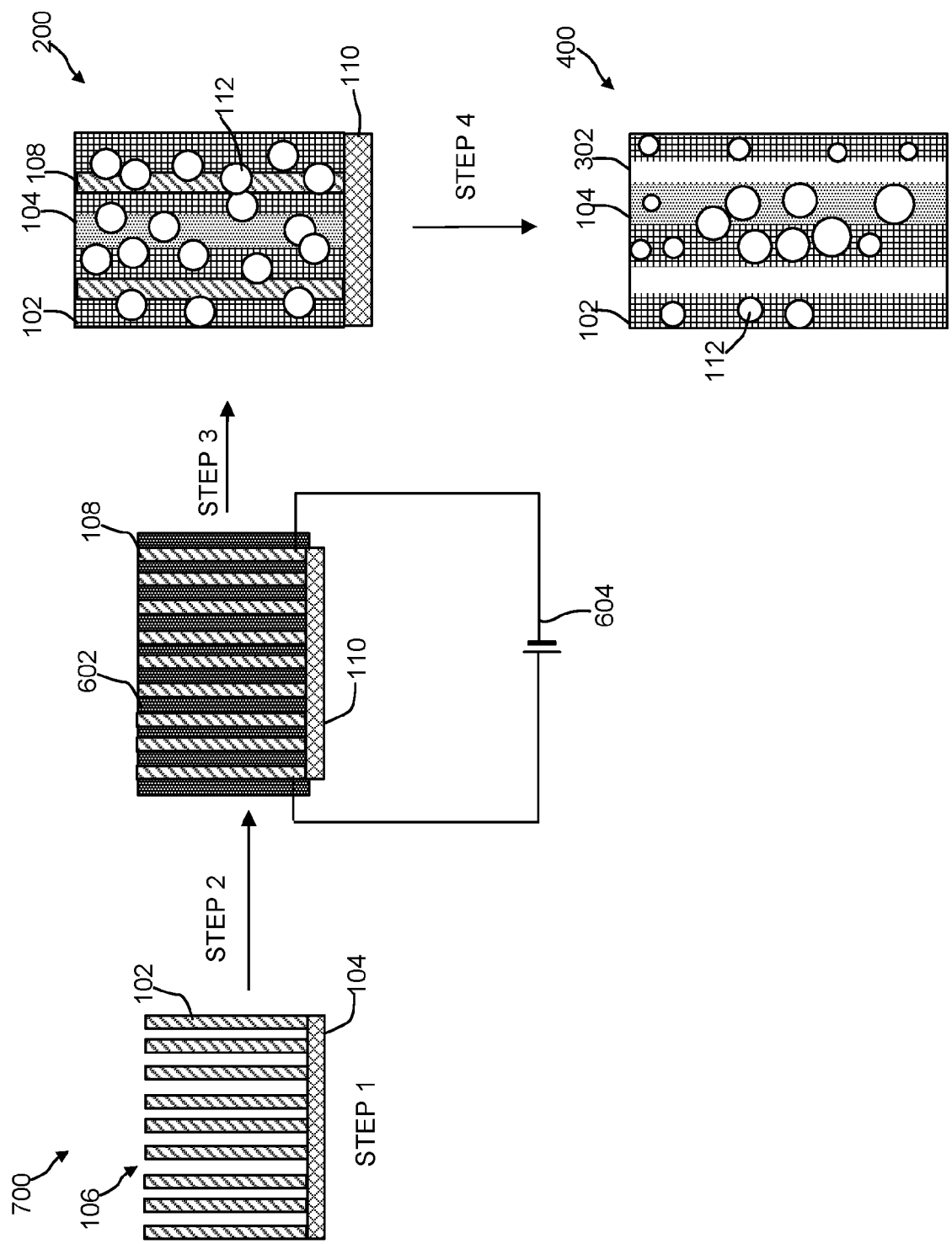
FIG. 7A is an illustration of an embodiment of a method to make the polymeric material of the present invention with nano- or microstructures.
Figure 7B:
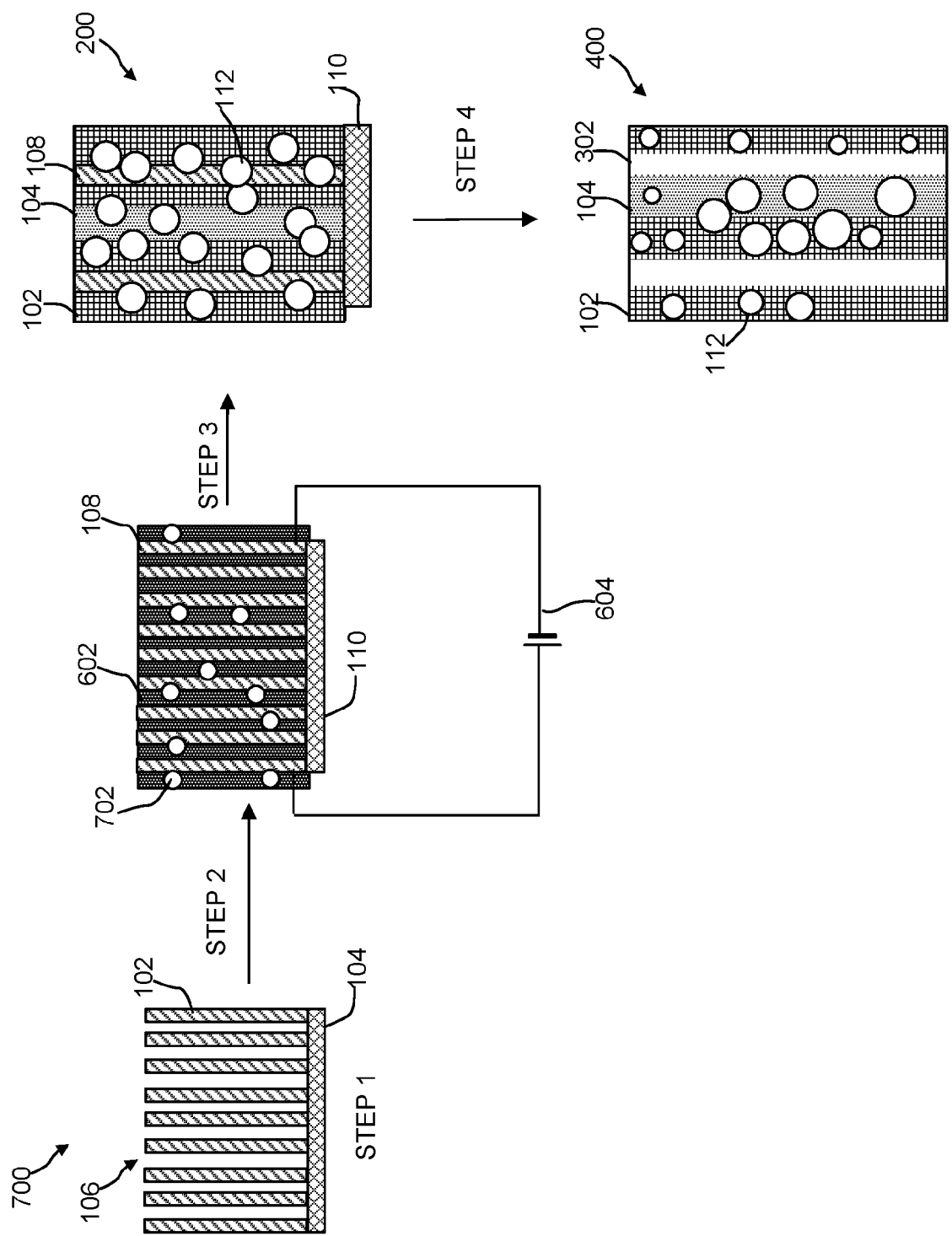
FIG. 7B is an illustration of an embodiment of a method to make the polymeric material of the present invention with void spaces.

Referring to FIG. 6, step 1 of method 600 can include obtaining electrically conductive template 106 having electrically conductive nanostructured materials 108 and support 110. In step 2, electrically conductive template 106 can be impregnated with a polymers or polymeric precursors, semi-crystalline polymers to form impregnated template 602. Impregnated template 602 can have a portion of, all or substantially all of the electrically conductive template 106 embedded in the polymeric matrix. The impregnation can be done using known methods, (e.g., spin-coating, dipping, spraying, wet-incipient method, high pressure impregnation, extrusion, compression, bulk solution, etc.). In step 3, the polymers or polymeric precursors can be heated by applying voltage across or to the electrically conductive template to resistive Joule heat impregnated template 602 to a temperature sufficient to polymerize polymer precursors or cross-link the polymers. Impregnated template 602 can be connected with electrical source 604 in a manner known in the art to supply voltage to electrical conductive nanostructured template 106. The power supply electrically excites the electrically conductive materials such that current flows between the electrically conductive nano- or microstructures. The current resistively heats at least a portion of template 106 and/or the polymeric material. Heat can transfer to the polymeric material by conduction and/or radiative heat transfer, and convert the polymeric material into polymeric material 100 or 200 having ordered arrangements of crystalline domains and amorphous domains. The amount of heat can be controlled by controlling the amount of voltage applied across the conductive layer. In some embodiments, the impregnated template can be heated to a temperature of 15° C. to 400° C., 20° C. to 300° C., 25° C. to 200° C., 30° C. to 100° C., 40° C. to 90° C., 50° C. to 80° C., 60° C. to 70° C. or any range or temperature there between for a time suitable to form the polymer (e.g., 0.5 min to 180 min.). Due to the design and ordered arrangement of nanostructures 108 in the electrically conductive template 106, resistive heating through the polymeric matrix impregnated on the template can occur. The resistive (Joule) heating can allow for tuning of PDI and DP of the polymer, which can aid in controlling glass transition properties ($T_G$) of the polymeric material. Due to the specific inter-template spacing of the template, voltage-induced controlled temperature gradients (e.g., heating and cooling gradient) around the electrically conductive nanostructured materials can result in a gradient of ordered crystallinity of polymer matrix (e.g., crystalline 102 and amorphous 104 regions). As shown in FIGS. 6, 7A, and 7B the areas 102 closer to the electrically conductive nanostructured materials 108 (e.g., areas 102) are crystalline and areas 104 farthest from the electrically conductive nanostructured materials are amorphous. Polymeric material 100 can be stored, packaged, formed into a film or membrane, or further processed. In some embodiments, the polymeric matrix can be heated excessively until carbonized shells are formed. The shells can either have retained templates or can be hollow. The shells can be used to incorporate nano- or microstructures within and retain architecture of the templates.

In step 4, a portion or all of electrically conductive nanostructured materials 108 and/or support material 110 can be removed, thereby resulting in polymeric material 300 having void spaces 302. By way of example, polymeric material 100, can be contacted with an etching solution (e.g., immersed in 10 wt % HF aqueous solution) for a desired amount of time (e.g., for 5 to 30 minutes) to partially remove electrically conductive nanostructured materials 108 and/or support 110 from polymeric material 100 to form a discrete void space where electrically conductive nanostructured materials 108 or support 110 used to be. Alternatively, higher concentration of the etching agent or more powerful etching agents can be used at a similar etching period of time to obtain the desired porous polymeric material. Selection of etchant can also allow for removal of amorphous component of polymer matrix or even a crystalized component to impart 3-D nano-porosity to the matrix. Non-limiting examples of etching agents that can be used include hydrofluoric acid (HF), ammonium fluoride ($NH_4F$), the acid salt of ammonium fluoride ($NH_4HF_2$), sodium hydroxide (NaOH), nitric acid ($HNO_3$), hydrochloric acid (HCl), hydroiodic acid (HI), hydrobromic acid (HBr), boron trifluoride ($BF_3$), sulfuric acid ($H_2SO_4$), acetic acid ($CH_3COOH$), formic acid (HCOOH), or any combination thereof. For example, silicon nanowires can be removed base and zinc oxide nanowires can be removed using an acid solution.

C. Preparation of Polymeric Material With Nano- or Microstructures.

The polymeric material of the present invention can include nano- or microstructures. Polymeric materials 200 and 400 can be made in a similar manner as described for polymeric material 100 and 200. Referring to FIG. 7A, in method 700 as in method 600 described above impregnated template 602 can be connected with electrical source 604 in a manner known in the art to supply voltage to electrical conductive nanostructured template 106. The power supply electrically excites the electrically conductive materials such that current flows between the electrically conductive nano- or microstructures. The current resistively heats at least a portion of the nanostructured template 106 and/or the polymeric material and/or the metal precursors. Heat can transfer to the polymeric material by conduction and/or radiative heat transfer, and convert the polymeric material into polymeric material 200 having ordered arrangements of crystalline domains and amorphous domains. The amount of heat can be controlled by controlling the amount of voltage applied across the conductive layer. In some embodiments, the impregnated template can be heated to a temperature of 15° C. to 400° C., 20° C. to 300° C., 25° C. to 200° C., 30° C. to 100° C., 40° C. to 90° C., 50° C. to 80° C., 60° C. to 70° C. or any range or temperature there between for a time suitable to form the polymer (e.g., 0.5 min to 180 min.) and form polymeric material 200. In some embodiments, metal precursors 702 added to the polymeric mixture are convert the metal precursors into nano- or microstructures 112 during the heating as shown in FIG. 7B. During the heating, when metal precursors are used, nucleation of the metal precursors into nano- or microstructures can be initiated. In some embodiments, the resistive heating can allow for simultaneous ordering of polymer chains and/or nucleation of nano- or microstructures. Without wishing to be bound by theory, it is believed that the resistive joule heating and the polymer chains can be used to tune the dispersion of nanoparticles within the matrix. Control of joule heating (voltage or temperature ranging between 50° C. and 80° C.), template size, spacing between templates, and polymer/nanoparticle precursor concentrations can allow for fine tuning of temperature gradients around the heaters. This in-turn can tune the order within the polymerizing matrix and simultaneously nucleate and grow nanoparticles within the polymerizing matrix. A similar approach can extended to crystalline thermosets for initiating their ordering and curing. Polymeric material 100 can be stored, packaged, formed into a film or membrane, or further processed. In some embodiments, additional nano- or microstructures can be added to the polymeric material after step 3.

Figure 7C:
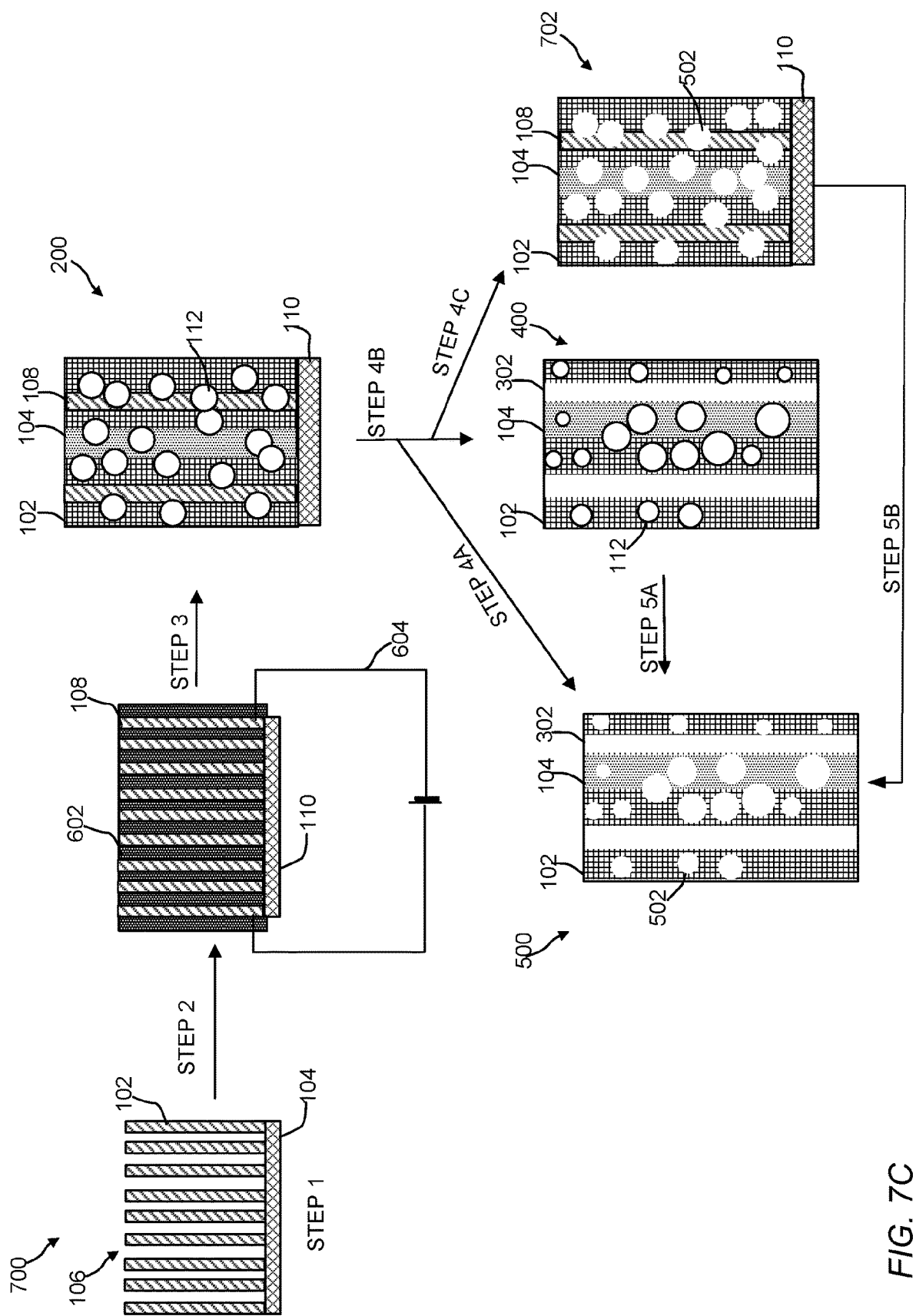
FIG. 7C is an illustration of an embodiment of a method to make the polymeric material of the present invention with additional void spaces created by the removal of nano- or microstructures.

In step 4, a portion or all of electrically conductive nanostructured materials 108, support 110, or nano- or microstructures 112 can be removed as described above in FIG. 6. Removal of a portion of these materials can result in polymeric material 400 having void spaces 302 and some nano- or microstructures 112 is depicted in FIG. 7B. As shown in FIG. 7C, nano- or microstructures 112 can be removed in a one step process (step 4A) to provide the material 500, or in a multi-step process (steps 4-5 in FIG. 7C) to provide the material 702 and/or the material 500. As shown, nano- or microstructures 112 can be removed prior to, during, or after the removal of electrically conductive nanostructured materials 108 and/or support 110 using different etching materials and/or etching times. Referring to FIG. 7C, step 4B, material 200 can be subjected to an etching agent to remove nanostructured materials 108 and/or support 110 and produce material 400 having voids 302 and nano- or microstructures 112. In step 5A, material 400 can then be subjected to a different solution to remove the nanoor microstructures and create material 500 having void spaces 502 and 302. In step 4C, a portion or all nano- or microstructures 112 can be removed to form a material 702 having electrically conductive nanostructured materials 108, support 110 and void spaces 502. In step 5B, the material 702 is then subjected to an etching agent that can remove all of the electrically conductive nanostructured materials 108, support 110 to form material 500. As shown in FIG. 7C, all of the nano- or microstructures and the electrically conductive nanostructured materials 108, support 110 are removed, however, it should be understood that portions of these materials can be removed depending on the etching conditions to tune the material for desired applications. In some embodiments, the removal of a portion of nano- or microstructures can result in yolk/shell type nano- or microstructures 112 (e.g., a metal nanoparticle in silica shell). The resulting polymeric material (e.g., materials 300, 400, 500, 702) can be stored, packaged, or formed into a film or membrane.

D. Articles of Manufacture and Applications of the Polymeric Material

The polymeric materials 100, 200, 300, 400, 500, or combinations thereof can be included in articles of manufacture and/or can be a pressure-sensitive adhesive, an electrode, a sensor, an actuator, a filter, a membrane, a modulator, a piezoelectric system, zero Poisson ratio (ZPR) material. The article of manufacture can include an electronic device, an optical element (e.g., ophthalmic lens, a display, a window, a mirror, a liquid crystal cell, an optical detector a modulator, or a light harvester), a gas or liquid separation membrane, a catalytic membrane for catalyzing a chemical reaction, a sensor, a structural component, an energy storage device, a gas capture or storage material, or a fuel cell).

In some instances, the polymeric materials 100, 200, 300, 400, 500, 702 or combinations thereof can be used in a variety of chemical reactions. Non-limiting examples of chemical reactions include oxidative coupling of methane reaction, a hydrogenation reaction, a hydrocarbon cracking reaction, an alkylation reaction, a denitrogenation reaction, a desulfurization reaction, a Fischer-Tropsch reaction, a syngas production reaction, a 3-way automobile catalysis reaction, reformation reactions, hydrogen generation reaction.

The methods used to prepare the polymeric materials of the present invention can be modified or varied as desired to design or tune the size of the void space, the selection of catalytic metal-containing particles, the dispersion of the catalytic metal-containing particles in the polymeric matrix, the porosity and pore size of the polymeric matrix, etc., to design an article of manufacture or other devices, or a catalyst for a specific chemical reaction.

EXAMPLES

The present invention will be described in greater detail by way of specific examples. The following examples are offered for illustrative purposes only, and are not intended to limit the invention in any manner. Those of skill in the art will readily recognize a variety of noncritical parameters, which can be changed or modified to yield essentially the same results.

Materials and Instruments

Polymers: Polymers were obtained from SABIC® (Saudi Arabia). Semi-crystalline polymers were high density polyethylene (SABIC® HDPE F00952), polyethylene terephthalate (SABIC® PET BC111), polypropylene (SABIC® PP 520L), low density polyethylene (SABIC® LDPE HP0823). Polyimide amorphous polymer was SABIC® ULTEM™ Resin 100.

Reagents: nitric acid ($HNO_3$) 70% and silver nitrate ($AgNO_2$) were obtained from Sigma-Aldrich® (U.S.A.). Hydrofluoric acid (48 to 51%) was obtained from Fisher Scientific (U.S.A.) PELCO® (Ted Pella, Inc) conductive sliver paint from Ted Pella, Inc. (U.S.A). Silicon Wafers having 3 inch diameter and 330 micrometer thickness were obtained from International Wafer Service (U.S.A.)

Instruments: Scanning electron microscopy (SEM) images were obtained using a JEOL USA, JSM-7800F Prime (JEOL, U.S.A). Optical microscopy images were obtained using a ZEISS, AX10, Imager.M2m (Carl Zeiss, Inc., U.S.A). Differential Scanning Calorimetry was performed using a TA Instruments DSC discovery series (TA Instrucments, U.S.A). X-ray Diffraction (XRD) images were obtained using a Philips X'Pert X-Ray Diffractometer (PANalytical, The Netherlands). Fourier transform infrared spectra (FTIR) were obtained using an Nicolet™ iS™ 50 FT-IR Spectrometer (Thermo Fisher Scientific, U.S.A). Atomic force microscopy (AFM) images were obtained using a Dimension Edge Atomic Force Microscopy (BRUKER, U.S.A).

Example 1

Semi-Crystalline Polymer Impregnated Materials—General Procedure

Figure 8:
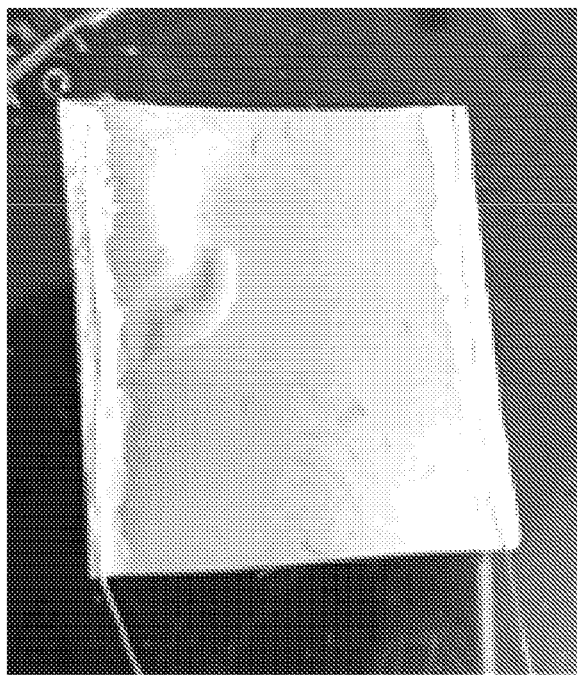
FIG. 8 is an image of a polymer film containing joule heaters used to make the polymeric material of the present invention.

Polymeric material containing joule heaters were fabricated by putting a droplet of silver paint on copper wire placed at the edge of the semi-crystalline polymer film containing joule heaters made by embedding sliver nanowires (Ag NW (SNW)) in the surface of a 3.5 cm×3.5 cm polymer film. The heaters had a resistance of about 30-35 Ω/square). The dimensions of the polymeric material with joule heaters were kept fixed for all the experiments. The supported material had a thickness of 60 microns or 150 micron. FIG. 8 is an image of a polymeric material containing joule heaters (film heater). A multi-meter was used to check the resistance of the electrode. DC voltage (2V-28.8 V) was applied for a specific duration (1 hr to 24 hr) to the film heater through a copper contact at the film edge and the current and resistance were monitored. The samples were characterized before and after joule heating, using SEM, DSC, FTIR, optical microscopy, AFM and XRD. Table 1 lists the sample number, and sample description (e.g., polymer and silver nanowire (SNW) having a short length of 10 to 20 μm or a long length of 30 to 40 μm in length. Table 2 lists samples, and voltage and current conditions for the Joule heating. After applying voltage on the samples, it was observed that shrinkage and contraction of the polymer film occurred. Samples softened at 100° C. were placed on a hotplate and heated to 100° C. The softening temperature for HDPE is about 125° C. A heating and cooling cycle included applying heat at 5V (heating) and then reducing the voltage to 2V (cooling) unless otherwise indicated. The cycle was repeated 2 or more times as indicated in Table 1.

Example 2

Semi-Crystalline Polymer Impregnated Materials with Nanoparticles—General Procedure)

Following the procedure described in Example 1, samples with nanowires and nanoparticles (150 to 200 nm diameter)

were prepared. These samples are designated (SNW-150) Silver nanowires and nanoparticles were spray-coated onto a polymer film. After drying, the film was inverted on a hot plate (silver nanowires & particles are in contact with the hot plate surface) at the desired temperature, followed by rolling with a steel rod. The samples were characterized before and after joule heating, using SEM, DSC, FTIR, optical microscopy, AFM and XRD. Table 1 lists the sample number, and sample description (e.g., polymer and silver nanowire (SNW) having a short length of 10 to 20 μm or a long length of 30 to 40 μm in length. Table 2 lists samples, and voltage and current conditions for the Joule heating. After applying voltage on the samples, it was observed that shrinkage and contraction of the polymer film occurred. A heating and cooling cycle included applying heat at 5V (heating) and then reducing the voltage to 2V (cooling) unless otherwise indicated. The cycle was repeated 2 or more times as indicated in Table 1. Samples softened at 100° C. were placed on a hotplate and heated to 100° C. The softening temperature for HDPE is about 125° C.

TABLE 1

| Sample # | Description |
| --- | --- |
| 1 | HDPE-Long SNW-150-After applying JH |
| 2 | HDPE-Long SNW-150-without JH |
| 3 | HDPE-Long SNW-150-After applying JH with different conditions |
| 4 | PP-Long SNW-150-After applying JH |
| 5 | PP-Long SNW-150-without JH |
| 6 | Blank HDPE |
| 7 | Blank PP |
| 8 | PET-Long SNW-150-After applying JH |
| 9 | PET-Long SNW-150-without JH |
| 10 | Blank PET |
| 11 | Blank HDPE with Softening at 100° C. |
| 12 | HDPE + SNW with Softening at 100° C. |
| 13 | HDPE + SNW with JH then Softening at 100° C. |
| 14 | HDPE + SNW with JH, Softening at 100° C., jH |
| 15 | HDPE-Long SNW-150-After applying JH |
| 16 | PP-Long SNW-150-After applying JH |
| 17 | PET-Long SNW-150-After applying JH |
| 18 | HDPE-Long SNW-150-After applying JH |
| 19 | HDPE-Long SNW-60-After applying JH |
| 20 | PET-Long SNW-60-After applying JH |
| 21 | HDPE-Mixed Long SNW-150 & Nanoparticles-After applying JH |
| 22 | HDPE-Long SNW-60-After applying JH |
| 23 | PP-Long SNW-60-After applying JH |
| 24 | PP-Long SNW-150-After applying JH [heating/cooling for two cycles] |
| 25 | HDPE-Long SNW-150-After applying JH [heating/cooling for two cycles] |
| 26 | LDPE-Mixed Long SNW-150 & Nanoparticles after applying JH [heating/cooling for two cycles] |
| 27 | HDPE-Long SNW-60-After applying JH [heating/cooling for two cycles] |
| 29 | HDPE-Blank-SNW-60 |
| 20 | PP-Blank-SNW-60 |
| 30 | PP-Long SNW-60-without JH |
| 31 | HDPE-Long SNW-60-without JH |

-60 and -150 refer to micron thickness of film.

TABLE 2

| Voltage (V) | SAMPLE # | $I_{initial}/I_{final}$ (mA) | $R_{@Voltage}$ Ω/☐ | Breakdown | Duration (hr) |
| --- | --- | --- | --- | --- | --- |
| 5 | HDPE 1 | 39-14/10 | 31 | No | 1 |
|  | HDPE 3 | 193-2/1 | 18 | No | 3 |
|  | PP 4 | 205-2/2 | 10 | No | 3 |
|  | PET 8 | 124-2/2 | 12 | No | 3 |
|  | HDPE | 35-2/2 | 153 | No | 24 |

TABLE 2-continued

| Voltage (V) | SAMPLE # | $I_{initial}/I_{final}$ (mA) | $R_{@Voltage}$ Ω/☐ | Breakdown | Duration (hr) |
| --- | --- | --- | --- | --- | --- |
|  | (HP) 14 |  |  |  |  |
|  | HDPE 15 | 300-3/3 | 23.5 | No | 4 |
|  | PP 16 | 320-2/2 | 12 | No | 4 |
|  | PET 17 | 106-91/43 | 28 | No | 20 |
|  | HDPE 18 | 142-16/16 | 22 | No | 4 |
|  | HDPE 19 | 59/2 | 20/97.3 | No | 24 |
|  | PET 20 | 1 | 11/25 | No | 4 |
|  | HDPE 21 | 15/1 | 6.5/73.5 | No | 2 |
|  | HDPE 23 | 56-8/4 | 22/72 | No | 2 |
| 2 | HDPE 1 | 10/4 | 55 | No | 1 |
|  | HDPE 3 | 1/2 | 25 | No | 3 |
|  | PP 4 | 2/2 | 29 | No | 3 |
|  | PET 8 | 2/2 | 30 | No | 3 |
|  | HDPE (HP) 14 | 2/2 | 172 | No | 10 |
|  | HDPE 15 | 2/2 | 31 | No | 4 |
|  | PP 16 | 2/2 | 76 | No | 4 |
|  | PET 17 | 43/43 | 58 | No | 10 |
|  | HDPE 18 | 16/8 | 39 | No | 4 |
|  | HDPE 21 | 2/2 | 73.5 | No | 4 |
|  | HDPE 23 | 4/4 | 72 | No | 10 |

Example 3

XRD Characterization

XRD analysis was conducted to determine the degree of crystallinity after applying Joule heating. The degree of crystallinity ($x_c$) can be represented by the following equation.

$$x_c = \frac{I_{crystalline}}{I_{crystalline} + I_{amorphous}}$$

where $I_{crystalline}$ and $I_{amorphous}$ were determined from the area under their respective curves in the XRD pattern. Table 3 lists the degree of crystallinity for various samples at 0 V, 5 V, and 2 V.

TABLE 3

| Voltage (V) | SAMPLE # | $X_C$ | Duration (h) |
| --- | --- | --- | --- |
| 5 and 2 | 1 | 0.64 | 1 and 1 |
| 0 | 2 | 0.62 | 0 |
| 5 and 2 | 8 | 0.099 | 3 and 3 |
| 0 | 9 | 0.12 | 0 |
| 0 | 11 | 0.68 | 3 minutes |
| 0 | 12 | 0.66 | 3 minutes |
| 5 and then 2 | 13 | 0.65 | 1 at each voltage |
| 5 and then 2 (twice before and after softening) | 14 | 0.64 | 1 at each voltage |
| 5 and 2 | 15 | 0.65 | 4 and 4 |

Example 4

DSC Characterization

DSC analysis on various HDPE and PP samples was conducted to determine the degree of crystallinity before and after applying Joule heating. The percentage of crystallinity (% $x_c$) was determined by DSC. Table 4 lists the DSC results and the % crystallinity the HDPE samples. Table 5 lists the DSC results and the % crystallinity for the PP samples. Table 6 lists DSC results for PET Samples 9, 10 and 20. Sample 20 was subjected to 5 V for 4 hours. At the same time, small part of blank PET film (Sample 10) and a PET film with SNW were placed above the sample 20 to heat the films.

TABLE 4

| Sample # | ONSET (° C.) | ENTHALPY (J/g) | PEAK (° C.) | $T_C$ (° C.) | % CRYST. |
|---|---|---|---|---|---|
| 6 | 122.042 | 176.74 | 127.902 | 119.1 | 60.2 |
|   | 121.817 | 195.95 | 130.055 | 119.0 | 66.7 |
| 1 | 122.009 | 168.52 | 127.465 | 119.0 | 57.4 |
|   | 121.924 | 190.68 | 130.172 | 119.0 | 64.9 |
| 2 | 122.027 | 173.39 | 127.629 | 119.0 | 59.1 |
|   | 121.955 | 190.58 | 130.095 | 118.9 | 64.9 |
| 3 | 122.014 | 178.69 | 127.728 | 118.8 | 60.9 |
|   | 121.920 | 201.70 | 130.239 | 118.9 | 68.7 |
| 11 | 121.7 | 188.5 (64.2) | 128.6 | 119.1 | 64.2 |
|   | 121.5 | 198.1 (67.5) | 130.5 | 119.0 | 67.5 |
| 12 | 120.8 | 182.8 (62.3) | 128.5 | 119.0 | 62.3 |
|   | 121.8 | 195.2 (66.5) | 130.1 | 119.0 | 66.5 |
| 13 | 121.3 | 185.3 (63.1) | 130.8 | 118.2 | 63.1 |
|   | 121.8 | 196.7 (67.0) | 131.0 | 118.3 | 67.0 |
| 14 | 121.9 | 178.4 (60.8) | 128.3 | 119.0 | 60.8 |
|   | 121.9 | 194.7 (66.3) | 130.2 | 119.0 | 66.3 |
| 19 | 123.0 | 166.2 | 128.3 | 118.8 | 56.6 |
|   | 122.0 | 183.9 | 130.3 | 118.8 | 62.6 |
| 21 | 122.9 | 169.5 | 128.1 | 119.0 | 57.7 |
|   | 121.9 | 191.9 | 130.2 | 118.9 | 65.4 |
| 22 | 122.8 | 168.4 | 128.2 | 118.8 | 57.4 |
|   | 122.0 | 187.3 | 130.3 | 118.8 | 63.8 |
| 25 | 121.8 | 179.9 | 128.0 | 119.0 | 61.3 |
|   | 121.7 | 197.6 | 130.3 | 119.0 | 67.3 |
| 28 | 123.1 | 171.8 | 128.1 | 119.1 | 58.5 |
|   | 121.8 | 187.8 | 130.0 | 119.0 | 64.0 |

TABLE 5

| Sample # | ONSET (° C.) | ENTHALPY (J/g) | PEAK (° C.) | $T_C$ (° C.) | % CRYST. |
|---|---|---|---|---|---|
| 4 | 150.076 | 79.822 | 162.101 | 118.1 | 38.6 |
|   | 158.411 | 94.683 | 161.454 | 117.9 | 45.7 |
| 5 | 149.953 | 77.637 | 162.244 | 118.0 | 37.5 |
|   | 158.413 | 90.943 | 161.105 | 117.8 | 43.9 |
| 7 | 150.290 | 73.489 | 162.218 | 117.7 | 35.5 |
|   | 158.254 | 97.467 | 160.944 | 117.6 | 47.1 |
| 23 | 150.5 | 81.1 | 150.5 | 118.0 | 39.2 |
|   | 157.9 | 94.0 | 161.0 | 117.9 | 45.4 |
| 24 | 149.7 | 82.8 | 162.1 | 118.0 | 40 |
|   | 158.2 | 99.3 | 161.3 | 117.8 | 48 |
| 29 | 151.1 | 82.5 | 162.6 | 117.3 | 39.9 |
|   | 157.7 | 96.9 | 160.7 | 117.2 | 46.8 |
| 30 | 149.9 | 81.9 | 162.7 | 118.4 | 39.6 |
|   | 158.0 | 97.2 | 160.8 | 118.4 | 47.0 |

TABLE 6

| Sample # | ONSET (° C.) | ENTHALPY (J/g) | PEAK (° C.) | $T_C$ (° C.) | % CRYST. |
|---|---|---|---|---|---|
| 20 | 75.7 | 232.3 | 32.1 | 247.2 | 173.1 |
|   | 81.2 | 232.1 | 32.4 | 246.9 | 172.7 |
| 10 | 72.9 | 231.2 | 34.5 | 246.8 | 176.5 |
|   | 81.8 | 230.2 | 34.7 | 246.1 | 175.4 |
| PET-SNW | 77.1 | 231.8 | 35.5 | 246.8 | 163.6 |
|   | 80.6 | 222.3 | 29.8 | 243.0 | 162.0 |

Similar to XRD, DSC results show increasing the joule heating time in a specific cycle leads to improvement in crystallinity. Specifically, the crystallinity degree for HDPE with SNW sample was 64.9% (sample 2) and for samples 3, 21 & 25 it became respectively 68.7, 65.4 & 67.3% after applying DC voltage. Also, in the PP samples the crystallinity degree was 43.9% without applying DC voltage (sample 5) and it became 45.7% (sample 4) after imposing to DC voltage. For the PP samples, a slight change in the crystallinity degree and melting temperatures between the samples before/after using Joule heating was observed. In sum, XRD and DSC on bulk of the films before and after joule heating showed crystallinity changes in the polymer matrix.

Example 5

Optical Microscope Characterization

Figure 9A:
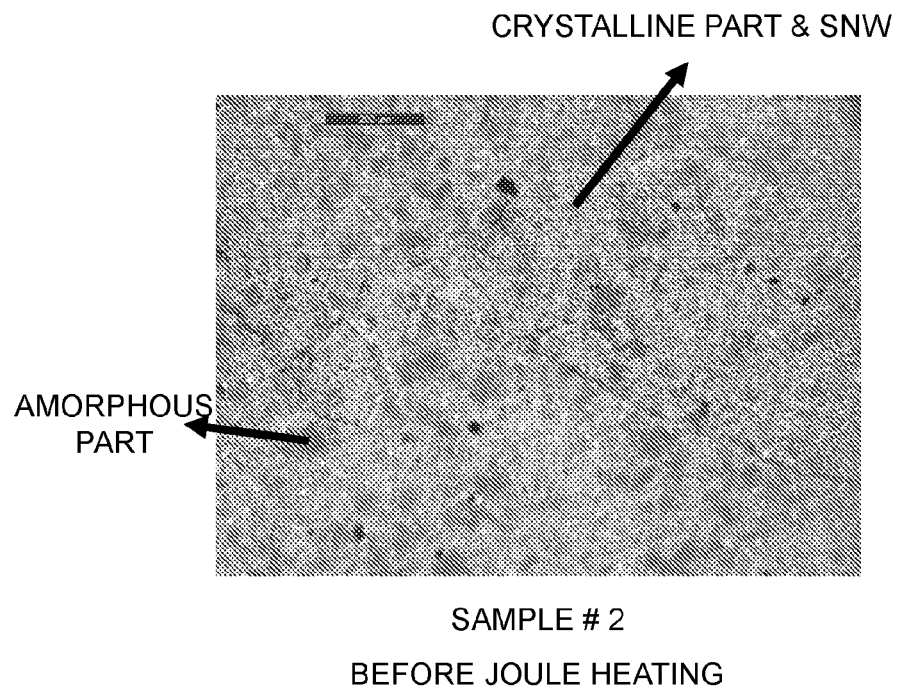
FIGS. 9A and 9B are optical microscope images of a high-density polyethylene sample (HDPE) with no joule heating and a HDPE sample after joule heating at 5 V using transmission mode.
Figure 9B:
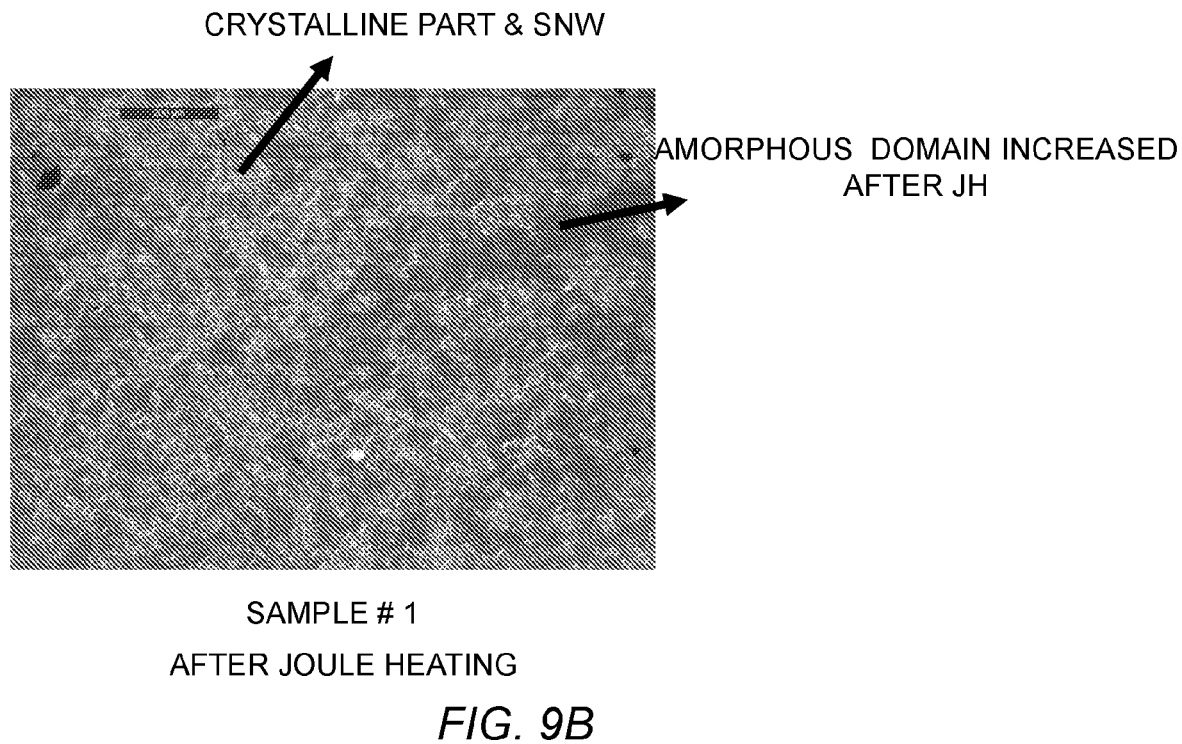
Figure 10A:
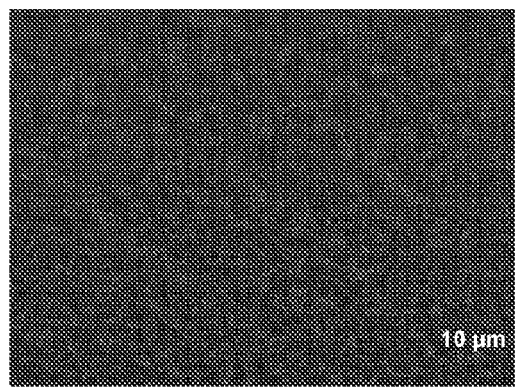
FIGS. 10A 10B, and 10C are optical microscope images of polypropylene (PP) blank, a PP sample with no joule heating and a polypropylene sample after joule heating using reflection mode.
Figure 10B:
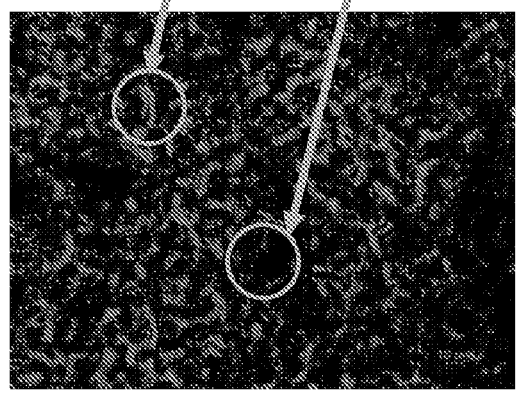
Figure 10C:
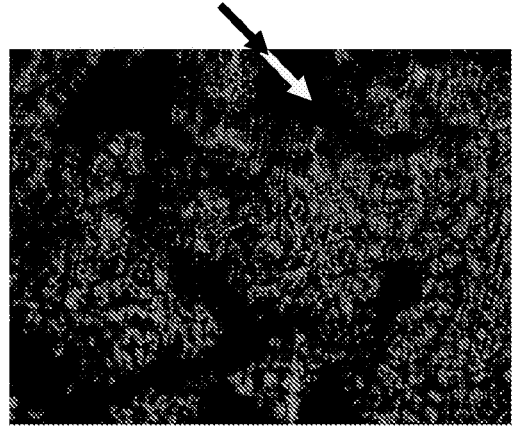
Figure 11A:
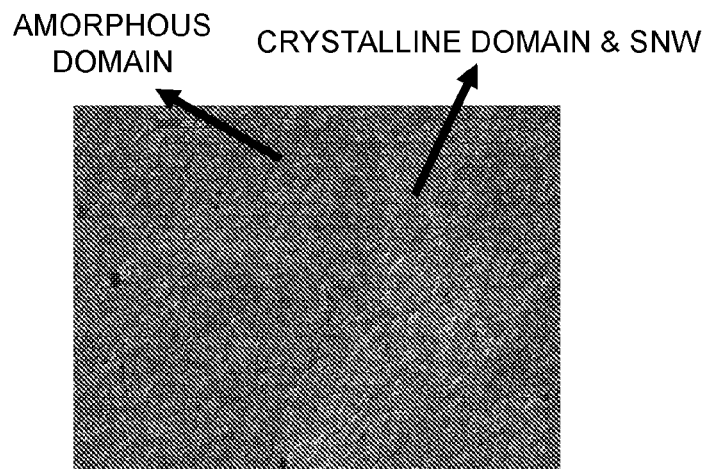
FIGS. 11A and 11B are optical microscope images of polyethylene terephthalate (PET) with no joule heating and a PET sample with joule heating using transmission mode.
Figure 11B:
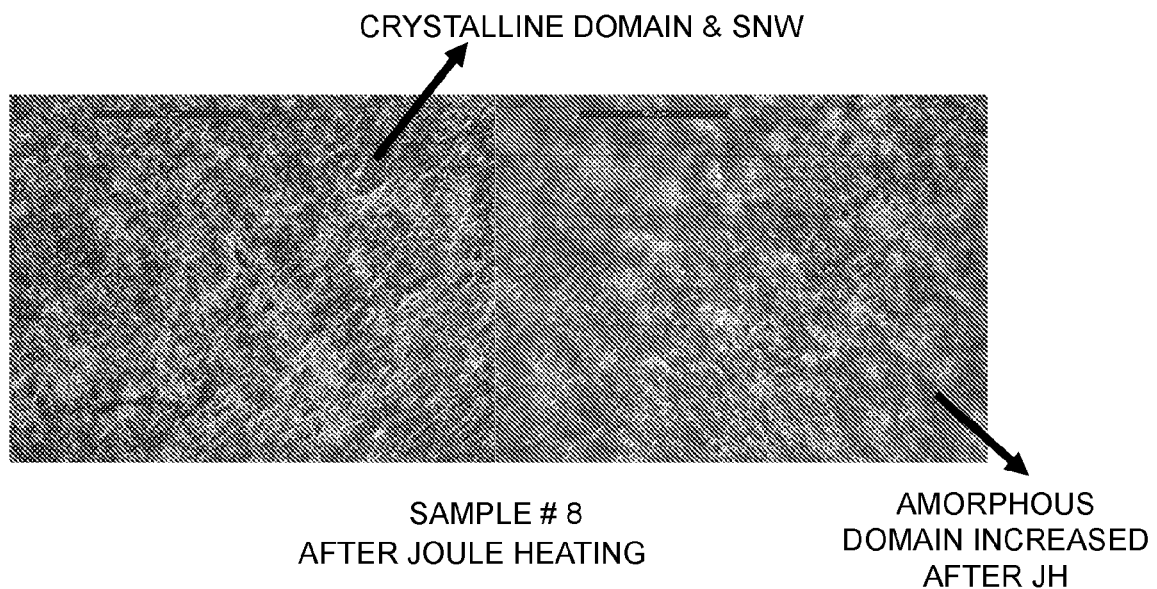

Optical microscope images were obtained of HDPE, PP, and PET samples before and after joule heating. FIGS. 9A and 9B are images of HDPE sample 2 (no joule heating) and HDPE sample 3 (joule heating at 5 V) using transmission mode. FIGS. 10A, 10B, and 10C are images of PP sample 7 (blank), PP sample 5 (no joule heating) and PP sample 4 (after joule heating) using reflection mode. FIGS. 11A and 11B are images of PET sample 9 (no joule heating) and PET sample 8 (joule heating) using transmission mode. These images showed changed in crystalline and amorphous regions in transmission and reflection mode, which indicated that joule heating influenced the polymer crystallinity.

Example 6

SEM Characterization after Removal of Nanowires to Form Void Spaces

Figure 12:
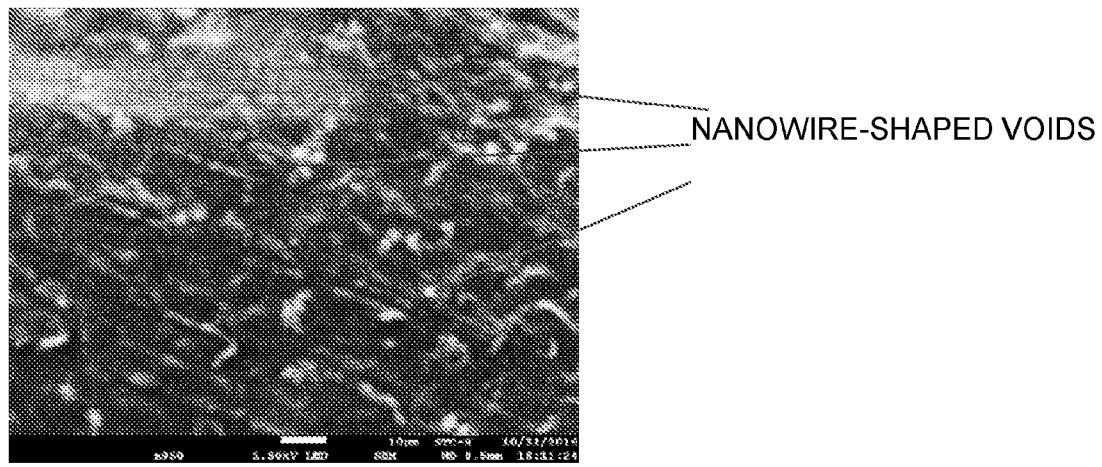
FIG. 12 is a scanning electron microscope (SEM) image of a joule heated PP-silver nanowire (SNW) film, where silver nanowires have been selectively etched to leave behind void spaces in the phase gradient polymer film.

The randomly dispersed silver nanowires were removed from the PP matrix to result in hollow portions within the polymer film. Joule heated PP-SNW films were treated with 70% $HNO_3$ for 24 hours, dried and then washed to remove residual nitric acid. The resulting films were analyzed by SEM. FIG. 12 is a SEM image of a heated PP-SNW film with void spaces. The resulting porous polymer nanocomposites included ordered and tunable crystalline and amorphous phase domains.

Example 7

AFM Characterization

Figures 13A, 13B, 13C:
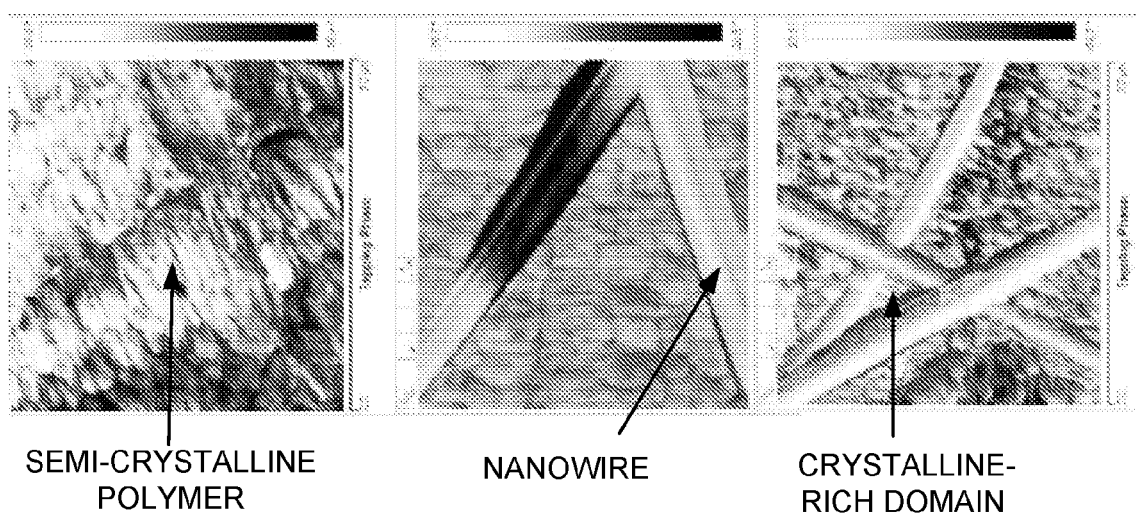
FIG. 13A is an atomic force microscope (AFM) image of a HPDE sample without SNW and no joule heating.
FIG. 13B is an AFM image of a HDPE with SNW prior to joule heating.
FIG. 13C is an AFM image of a HDPE with SNW after joule heating.

AFM images of HDPE films were obtained before and after joule heating. FIG. 13A is an AFM image of HPDE sample 6 without SNW and no joule heating. The morphology of this sample is semi-crystalline. FIG. 13B is an AFM image of HDPE sample 2 with SNW and no joule heating. The morphology of this sample is semi-crystalline. FIG. 13C is an AFM image of HDPE sample 1 with SNW and after joule heating. In FIG. 13C the triangular region between the nanowired generated high temperatures, resulting in a crystalline domain. The area outside the triangle has more dark spots/regions, which confirmed a greater extent of amorphous regions. A significant change in the local crystalline and amorphous regions was observed in AFM where phase imaging showed brighter regions (crystalline) to become smaller (or greater number of crystalline grain) after joule heating. This was also consistent with the optical microscopy images, where the crystalline region schrank after the joule heating. A gradient of bright and dark regions was observed in AFM between two nanowires. This is indicative of temperature gradients developed between two nanowires during the joule heating process and cycles of high and low voltage, which led to the change in crystallinity of the polymer between the nanowires—or phase gradient polymer films.

Example 8

Preparation of PET Samples with Ag Nanoparticles on Si-Wafer

An aqueous solution of silver nitrate (0.339 mg in 100 mL water) was prepared. An aqueous hydrofluoric acid (10 mL containing 40 mL HF) was added to the silver nitrate solution. A silicon wafer was immersed in the acidic silver nitrate solution for 45 min and then heated for 45 minutes at 100° C. The silver nitrate nanoparticles were distributed on the silicon wafer with good organization. The silicon wafer was then dipped in molten PET. Molten PET was made by melting PET pellets at 160 to 180° C. for 15 to 20 minutes. Five samples were prepared (PET-Si—Ag, 1, 2, 3, 4, and 5). The samples were cycled for 1 hour through various heating and cooling cycles. Table 7 lists samples, voltage, and current conditions for the Joule heating.

TABLE 7

| SAMPLE # | Voltage (V) | Current (mA) | $R_{in}$ (Ω) | $R_f$ (Ω) |
| --- | --- | --- | --- | --- |
| PET-Si—Ag 1 Heating | 4 | 539 | 374 | |
| PET-Si—Ag 1 Heating | 3.5 | 335 | | |
| PET-Si—Ag 1 Cooling | 1.5 | 138 | | |
| PET-Si—Ag 1 Heating | 3.5 | 314 | | |
| PET-Si—Ag 1 Cooling | 1.5 | 139 | | 1.3 K |
| PET-Si—Ag 2 Heating | 28 | 3 | 639 | |
| PET-Si—Ag 2 Cooling | 12 | 3 | | |
| PET-Si—Ag 2 Heating | 28 | 3 | | |
| PET-Si—Ag 2 Cooling | 12 | 3 | | 2 K |
| PET-Si—Ag 3, 4, 5 Heating | 28.8 | 3 | 805/288/830 | |
| PET-Si—Ag 3, 4, 5 Cooling | 12 | 2 | | |
| PET-Si—Ag 3, 4, 5 Heating | 28.8 | 3.5 | | |
| PET-Si—Ag 3, 4, 5 Cooling | 12 | 3 | | |
| PET-Si—Ag 3, 4, 5 Heating | 28.8 | 4 | | |
| PET-Si—Ag 3, 4, 5 Cooling | 12 | 3 | | 2.8 K/3 K/2.5 K |

Comparative Example

Polyimide with Joule Heaters

Three polyimide with long SNW samples (Samples A, B, and C) were prepared as described for Example 1. Sample A was treated at multiple voltages and current until breaking. Sample B was treated at 28 V for 1 hour. Sample C was treated at 15 V for 1 hour. Samples A, B, and C, and an ULTEM Resin 1000 pellet were analyzed by DSC. Table 8 lists the DSC results. From the results, it was determined that no crystallization occurred.

TABLE 8

| Sample | TG (° C.) | ΔCp (J/g/° C.) | TG (° C.)* | ΔCp (J/g/° C.)* |
| --- | --- | --- | --- | --- |
| Polyimide Pellet | 216.3 | 0.27 | 216.6 | 0.28 |
| Sample A | 216.5 | 0.26 | 215.4 | 0.24 |
| Sample B | 215.9 | 0.21 | 215.9 | 0.20 |
| Sample C | 216.4 | 0.24 | 215.3 | 0.24 |
| Blank** | 215.8 | 0.28 | 215.5 | 0.23 |

*TG is determined from the mid-point at half-height.
**Blank is ULTEM - SNW no joule heating.

The invention claimed is:

1. A polymeric material comprising a polymeric matrix comprising a polymer, wherein the polymeric matrix has an ordered arrangement of nanoscale polymeric crystalline phase domains, an ordered arrangement of nanoscale polymeric amorphous phase domains, and nano- or microstructures embedded or dispersed in the polymeric matrix,
wherein the polymeric matrix is a porous material with an ordered arrangement of void spaces that extends through an entire thickness of the polymeric matrix.

2. The polymeric material of claim 1, wherein the ordered arrangement of voids represent areas wherein an electrically conductive nanostructured template has been partially or fully etched away from the matrix, and wherein the electrically conductive nanostructured template comprises an arrangement of nanostructures; and wherein the nanostructures of the template are nanowires.

3. The polymeric material of claim 1, wherein the ordered arrangement of voids represent areas wherein an electrically conductive nanostructured template has been partially or fully etched away from the matrix, and wherein the electrically conductive nanostructured template comprises an arrangement of nanostructures; and wherein the nanostructures of the template are nanotubes.

4. The polymeric material of claim 3, wherein the ordered arrangement of voids represent an area where an electrically conductive nanostructured template has been partially or fully etched away from the matrix, and wherein the electrically conductive nanostructured template comprises an arrangement of nanostructures.

5. The polymeric material of claim 4, wherein the nanostructures of the template are nanowires, nanorods, nanospike, nanofibers, nanodisks, nanospheres, nanoellipsoid, nanoballs, nanograss, nanoflower or any combination thereof.

6. The polymeric material of claim 5, wherein the nanostructures of the template are vertically aligned slanted, randomly dispersed, or form a polygonal shape, a triangle shape, a square shape, a flower shape, a grass shape, a gyroid shape, a flagella shape, a hair shape, a seaweed shape, or a sea urchin shape.

7. The polymeric material of claim 6, wherein nanostructures of the template form triangle-like shapes, and wherein the regions between the nanowires result in the nanoscale polymeric crystalline phase domains.

8. The polymeric material of claim 1, wherein the ordered arrangements of nanoscale polymeric crystalline phase domains and nanoscale polymeric amorphous phase domains are the reaction product of resistive Joule heating of an electrically conductive nanostructured template and a precursor composition comprising (i) polymerizable monomers, pre-polymers, or polymers, a combination thereof, or (ii) a polymer melt.

9. The polymeric material of claim 1, wherein the polymeric matrix is a thermoplastic polymeric matrix, a thermoset polymeric matrix, or a combination thereof.

10. The polymeric material of claim 1, wherein the material is in the form of a film or a membrane.

11. The polymeric material of claim 1, wherein the nano- or microstructures comprise a metal, multimetallic compounds, an alloy, a metal oxide, a metal carbide, a metal or non-metal nitride, a metal dichacolgenide, or a 2D nanomaterial or corresponding derivatives comprised of silicene, germanene, graphene, or phosphorene.

12. The polymeric material of claim 1, wherein the material is anisotropic.

13. An article of manufacture comprising the polymeric material of claim 1.

14. A method for making the polymeric material of claim 1, the method comprising:
(a) impregnating an electrically conductive nanostructured template with a precursor composition comprising (i) polymerizable monomers, pre-polymers, or polymers, a combination thereof, or (ii) a polymer melt;
(b) forming nanostructures or microstructures embedded or dispersed in the polymeric matrix;
(c) applying a voltage across the electrically conductive nanostructured template to heat the nanostructured template though resistive Joule heating, wherein the heat converts the precursor composition into a polymeric matrix having an ordered arrangement of nanoscale polymeric crystalline phase domains and an ordered arrangement of nanoscale polymeric amorphous phase domains; and
(d) partially etching away the nano- and/or microstructures to create void spaces in the polymeric matrix.

15. The method of claim 14, wherein the electrically conductive nanostructured template comprises an arrangement of nanostructures.

16. The method of claim 15, wherein the nanostructures of the template are vertically aligned slanted, randomly dispersed, or form a polygonal shape, a triangle shape, a square shape, a flower shape, a grass shape, a gyroid shape, a flagella shape, a hair shape, a seaweed shape, or a sea urchin shape.

17. The method of claim 14, wherein the nanostructured template comprises a conductive metal or metal oxide thereof, or a conductive carbon-containing material, wherein the conductive metal or metal oxide thereof comprises silver, gold, zinc, indium, tin, palladium, platinum, nickel, copper, silicon, cobalt, iron, any combination thereof, and alloy thereof.

18. The method of claim 14, wherein the heating temperature of the electrically conductive nanostructured template in step (c) is tunable by modifying the amount of voltage applied across the template or the conductive nanostructured template volume fraction, size, and type, and wherein modifying the heating temperature allows for tuning the amount of and/or size of the crystalline and amorphous domains.

19. The method of claim 14, wherein the ordered arrangement of nanoscale polymeric crystalline phase domains are positioned closer to the electrically conductive nanostructures of the template when compared with the ordered arrangement of nanoscale polymeric amorphous phase domains.

* * * * *

UNITED STATES PATENT AND TRADEMARK OFFICE
CERTIFICATE OF CORRECTION

PATENT NO. : 10,683,404 B2
APPLICATION NO. : 15/776828
DATED : June 16, 2020
INVENTOR(S) : Nitin Chopra et al.

It is certified that error appears in the above-identified patent and that said Letters Patent is hereby corrected as shown below:

On the Title Page

In Item (56) References Cited, on page 2, Line 67, "Nanowiree" should read --Nanowire--.

Signed and Sealed this
Fourteenth Day of July, 2020

Andrei Iancu
*Director of the United States Patent and Trademark Office*